(12) United States Patent  (10) Patent No.: US 8,325,370 B2
Hashimoto  (45) Date of Patent: Dec. 4, 2012

(54) NETWORK INTERFACE APPARATUS, CONTROL METHOD, PROGRAM, AND IMAGE FORMING APPARATUS

(75) Inventor: Hiroshi Hashimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 12/567,668

(22) Filed: Sep. 25, 2009

(65) Prior Publication Data

US 2010/0079805 A1    Apr. 1, 2010

(30) Foreign Application Priority Data

Sep. 30, 2008  (JP) ................................. 2008-252265
Dec. 17, 2008  (JP) ................................. 2008-320560

(51) Int. Cl.
G06F 15/00 (2006.01)
H02H 3/00 (2006.01)
(52) U.S. Cl. ........................................ 358/1.15; 361/62
(58) Field of Classification Search .................. None
See application file for complete search history.

(56) References Cited

U.S. PATENT DOCUMENTS

2007/0183107 A1* 8/2007 Okada .............................. 361/62
2008/0080000 A1* 4/2008 Kadota ......................... 358/1.15

FOREIGN PATENT DOCUMENTS

JP    2007058746    3/2007
JP    2007251279    9/2007

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A mechanism which can avoid, as much as possible, a difference of picture quality that is caused by restricting color printing according to an authority and forcedly performing monochromatic printing is provided. A mechanism which restricts the color printing according to the authority without deteriorating performance is also provided. The processing refers to a color restricting mode in user information or a color restricting mode in setting information. When the referred color restricting mode indicates "force", if the user does not have the authority in which a color job can be printed, the job is forcedly converted into monochrome. In case of "analyze", if the user does not have the authority in which a color job can be printed, the job is analyzed. If it is the color job, a forced monochromatic printing or print inhibition is performed.

12 Claims, 28 Drawing Sheets

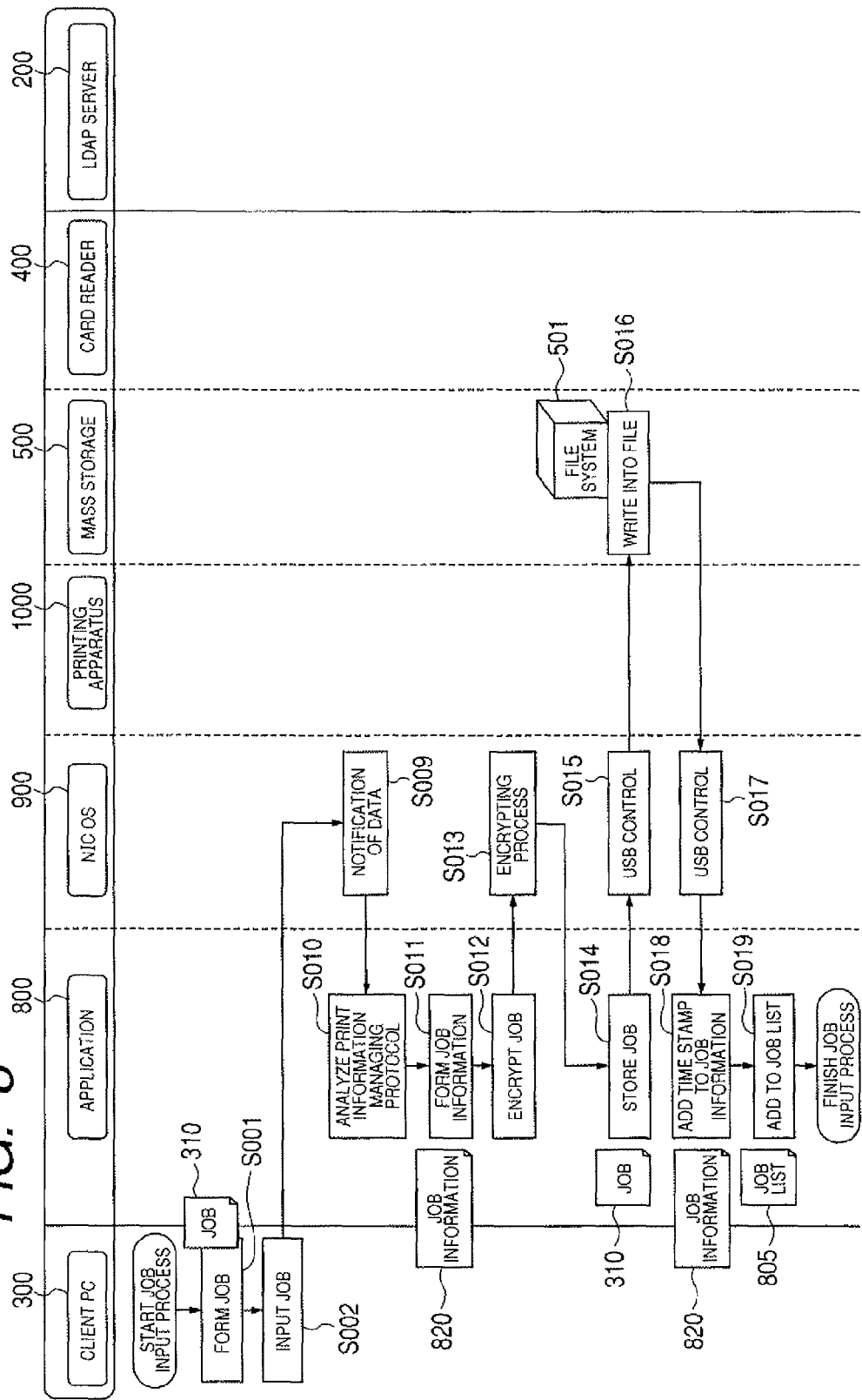

FIG. 17

SETTING INFORMATION 802

| Suffix | dc=com, dc=local | 831 |
|---|---|---|
| ID CODE | ou=div | 832 |
| PRIMARY SERVER | 192.168.0.1 | 833 |
| PRIMARY PORT | 389 | 834 |
| SECONDARY SERVER | 192.168.0.2 | 835 |
| SECONDARY PORT | 389 | 836 |
| USER | uid=abcd, ou=admin, dc=com, dc=local | 837 |
| PASSWORD | ******** | 838 |
| COLOR RESTRICTING MODE | FORCE, ANALYZE, OR NOT APPLY | 839 |
| POST-ANALYSIS PRINT MODE | FORCE OR INHIBIT | 840 |

FIG. 18

| No | MESSAGE |
|---|---|
| 2 | SERVER ERROR |
| 3 | USER IS NOT REGISTERED |
| 4 | USER ERROR |
| 5 | THERE IS NO JOB |

310 JOB
- 311 PRINT INFORMATION MANAGEMENT HEADER
- 315 <PDL DATA> ... COLOR MODE DECLARATION, COLOR MODE CHANGE, COLOR MODE CHANGE ...

PRINT INFORMATION MANAGEMENT HEADER 311

| | | |
|---|---|---|
| JOB OWNER | admin | 312 |
| JOB NAME | TEST.txt | 313 |
| COLOR MODE | COLOR/MONOCHROMATIC/AUTOMATIC | 314 |

JOB INFORMATION 820

| | | |
|---|---|---|
| USER NAME | admin | 821 |
| FILE NAME | 00012345.prn | 822 |
| JOB NAME | TEST.txt | 823 |
| TIME STAMP | 200804010940 | 824 |

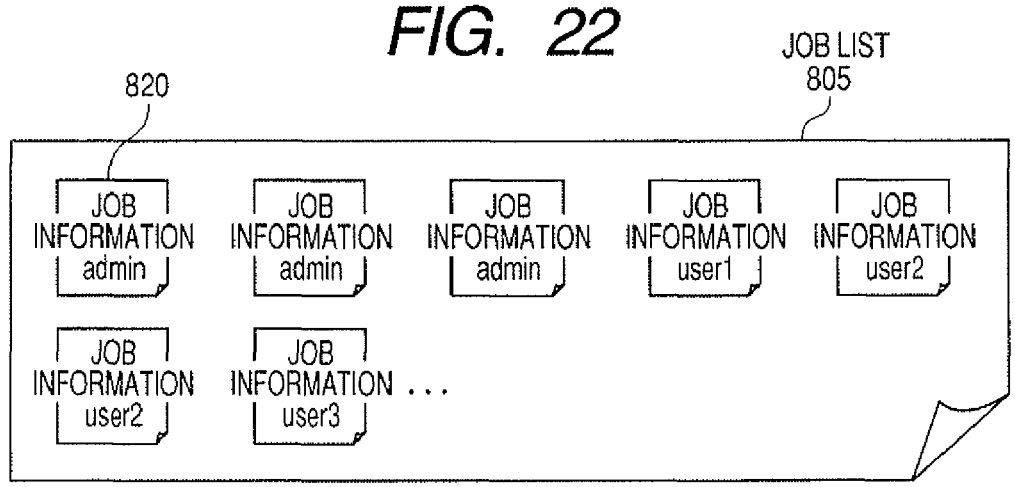
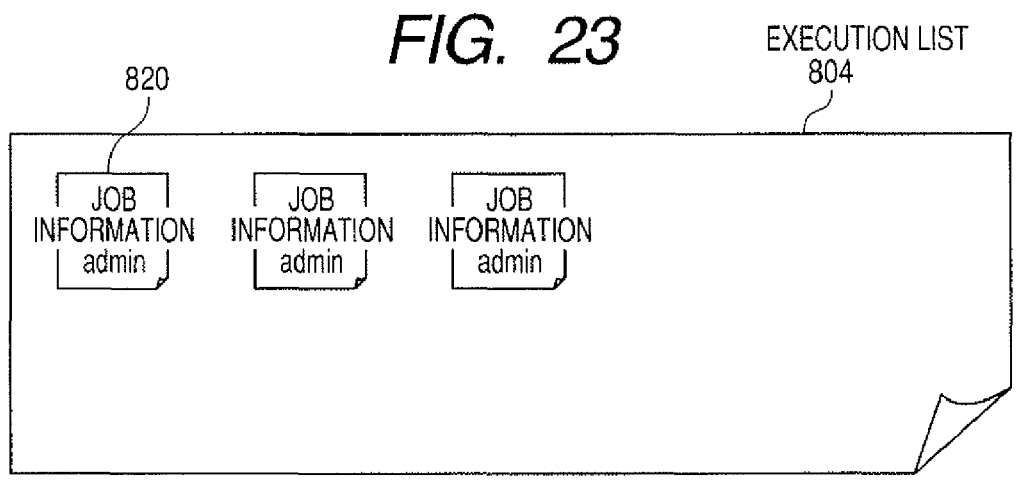
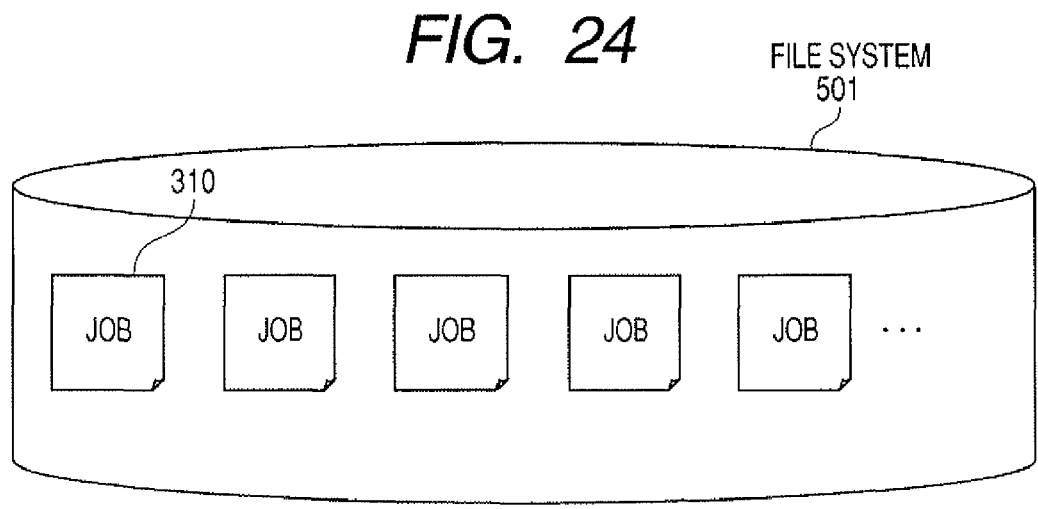

IC CARD 410

| CARD ID | 1234567890 | ~211 |

USER INFORMATION 210

| CARD ID | 1234567890 | ~211 |
|---|---|---|
| USER NAME | admin | ~212 |
| PASSWORD | xxxxxxx | ~213 |
| SUB-USER 1 | admin2 | ~214 |
| SUB-USER 2 | boss | ~215 |
| SUB-USER 3 |  | ~216 |
| SUB-USER 4 |  | ~217 |
| USE RESTRICTION | 0000 | ~218 |
| COLOR RESTRICTING MODE | FORCE, ANALYZE, NOT APPLY, OR NOT SET | ~219 |
| POST-ANALYSIS PRINT MODE | FORCE, INHIBIT, OR NOT SET | ~220 |

| No | MESSAGE |
|---|---|
| 2 | SERVER ERROR |
| 3 | USER IS NOT REGISTERED |
| 4 | USER ERROR |
| 5 | THERE IS NO JOB |
| 6 | DURING ANALYSIS |

JOB INFORMATION 820

| USER NAME | admin | 821 |
| FILE NAME | 00012345.prn | 822 |
| JOB NAME | TEST.txt | 823 |
| TIME STAMP | 200804010940 | 824 |
| HEADER COLOR INDEX | 248 | 825 |
| COLOR INFORMATION | COLOR/MONOCHROMATIC/DURING ANALYSIS | 826 |

NETWORK INTERFACE APPARATUS, CONTROL METHOD, PROGRAM, AND IMAGE FORMING APPARATUS

BACKGROUND OF THE INVENTION

1. Field of the Invention

The present invention relates to a network interface apparatus provided for an image forming apparatus which is communicatably connected to an information processing apparatus for producing and transmitting print data and also relates to a control method, a program, and the image forming apparatus.

2. Description of the Related Art

Hitherto, a print system in which print data printed by the user is temporarily accumulated into a printing apparatus and a printing is requested to the print data accumulated in the printing apparatus has been proposed. As an example of such a print system, a system disclosed in Japanese Patent Application Laid-Open No. 2007-251279 is mentioned. According to such a literature, a mechanism in which a multifunction apparatus (or hybrid apparatus) is provided with an authenticating function and can print only the print data of the authenticated user in the print data which has temporarily been accumulated has been disclosed. Owing to such a mechanism, such a situation that printed matter is left for a long time can be prevented and the secure print system can be provided.

Hitherto, such a demand that the user wants to restrict a color printing has existed. As an example of a print system which satisfies such a demand, a system disclosed in Japanese Patent Application Laid-Open No. 2007-058746 is mentioned. According to such a literature, there have been disclosed: a first unit for inhibiting a color job by color information (additional information) added to a job; and a second unit for changing a color mode to a monochromatic mode and making an output restriction.

However, the print system as disclosed in Japanese Patent Application Laid-Open No. 2007-251279 can be applied only to an expensive printing apparatus such as a multifunction printer (MFP) called a hybrid apparatus in which a hard disk having a large memory capacity is equipped and which has a high processing ability. In many enterprises, local governments, schools, and the like, in order to reduce costs, many expensive printing apparatuses such as MFPs are not introduced but many reasonable printing apparatuses such as single function printers (SFPs) in which the hard disk having the large memory capacity is not equipped are introduced. Therefore, a print system which can be applied even to a printing apparatus such as an SFP and in which a printed matter is not left is demanded. For this purpose, it is considered to provide a print system in which a printing apparatus such as an SFP is provided with the authenticating function and is equipped with an externally-attached storing device (for example, USB memory) which can accumulate print data.

However, if the first unit proposed in Japanese Patent Application Laid-Open No. 2007-058746 is simply applied to the print system using the printing apparatus such as an SFP, such a problem that performance deteriorates extremely occurs. Japanese Patent Application Laid-Open No. 2007-058746 is made on the assumption that, as a prerequisite, whether or not the job is the color job can be discriminated with reference to the additional information formed by a printer driver. However, a printer driver which forms such a job that whether or not the job is the color job cannot be discriminated merely by referring to the additional information also exists. In such a case, in order to discriminate whether or not the job is the color job, a print server needs to analyze all PDL data formed by the printer driver. An analyzing time becomes long in proportion to a job size.

Particularly, in the case of the print system in which the external storing device is equipped for the printing apparatus such as an SFP, it is indispensable to cope with a countermeasure against a case where the external storing device has been stolen (removed). Therefore, when the print data is stored into the external storing device, it is necessary to encrypt the print data. In the case where the encrypted print data has been stored in the external storing device, even when a part (additional information) of the print data is merely changed in order to forcedly print the print data in the monochromatic mode, a process for decrypting (decoding) all of the print data and encrypting again is necessary, so that it further takes a time for the process. Such an increase in processing time due to the decryption and encryption causes the performance of the printing apparatus to be extremely deteriorated in the printing apparatus such as an SFP. This is because the printing apparatus such as an SFP has been designed for the purpose of only printing, applications which operate in the printing apparatus such as an SFP has been designed so that they operate on an NIC (network interface card) connected to the printing apparatus, and the processing ability is extremely inferior to that of the printing apparatus such as an MFP, the print server, or the like. If it takes a time for analysis such as a decryption (decoding) or the like, the system enters a state where the printing process has been stopped, and a large delay occurs in the business.

A problem also occurs in the case where the second unit proposed in Japanese Patent Application Laid-Open No. 2007-058746 is applied to the print system using the printing apparatus such as an SFP. That is, there is such a problem that a difference occurs between picture quality of a print image which is output by an ordinary monochromatic job and that by a job which has forcedly been converted into a monochromatic job. In order to forcedly monochromatically convert the job, it is necessary to rewrite the additional information of the job. In such a case, although the PDL (Page Description Language) data formed by the printer driver is color data, only the additional information is in a state where the monochromatic mode has been designated. After the job in which only the additional information has been designated in the monochromatic mode was input to the printing apparatus, it is monochromatically converted by the function of the printing apparatus main body and output. In the case of the ordinary monochromatic job, in other words, when the monochromatic job is formed by the printer driver, the PDL data itself is monochromatically formed. After the monochromatic job formed by the printer driver was input to the printing apparatus, the job is output as it is as a monochromatic job formed by the printer driver without executing the monochrome converting process in the printing apparatus main body. Since a main part (process) for forming the monochromatic job in the former job and that in the latter job differ as mentioned above, the difference occurs between picture quality of the print images which are output. That is, if the second unit proposed in Japanese Patent Application Laid-Open No. 2007-058746 is simply applied, when the user in which an output restriction of the color printing has been made inputs the color printing job, the job is always monochromatically converted and output, so that the desired picture quality cannot be obtained.

The reasons why the picture quality differs depending on the difference between the main parts (processes) are as follows. Since the SFP has initially been designed only for the monochromatic printing, besides the image processes for the monochromatic printing, image processes for the color printing are added. Although a halftone process, a multivalue/binary process, and the like are executed in the image processes, a halftone process according to the color data is executed in the image processes for the color printing, and a halftone process according to the monochromatic data is executed in the image processes for the monochromatic printing. Therefore, a difference occurs between the picture quality of the print image which is output in the case where the halftone process is executed to the color data and the data is converted into the monochromatic data (in the case where the color data is forcedly monochromatically converted) by the image processes for the color printing and that in the case where the halftone process is executed to the monochromatic data by the image processes for the monochromatic printing.

SUMMARY OF THE INVENTION

It is, therefore, an object of the invention to provide a mechanism which can avoid, as much as possible, a difference in picture quality that is caused by restricting a color printing by an authority and forcedly executing a monochromatic printing. Another object of the invention is to provide a mechanism which restricts a color printing according to an authority without deteriorating performance.

To accomplish the foregoing objects, according to the invention, there is provided a network interface apparatus which is connected to an image forming apparatus and can communicate with an information processing apparatus for transmitting print data including management information and an external apparatus for storing print authority information, comprising: a print data receiving unit configured to receive the print data from the information processing apparatus; a first storage unit configured to store the print data received by the print data receiving unit into a memory; a user identification information receiving unit configured to receive user identification information for identifying a user; a print authority information obtaining unit configured to obtain the print authority information corresponding to the user identification information received by the user identification information receiving unit from the external apparatus; a color print discriminating unit configured to discriminate whether or not the user can perform a color printing according to the print authority information; a print data analyzing unit configured to perform a color analysis of the print data stored in the memory; and a print data transmitting unit configured to transmit the print data stored in the memory to the image forming apparatus in order to allow the image forming apparatus to print the print data, wherein if it is determined by the color print discriminating unit that the color printing cannot be performed and if it is determined as a result of the analysis by the print data analyzing unit that the print data does not include color data, the print data transmitting unit transmits the print data to the image forming apparatus without changing color/monochrome setting information included as management information in the print data to monochrome. Thus, a mechanism which can avoid a deterioration in picture quality that is caused by restricting the color printing according to the authority and forcedly monochromatically printing can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart illustrating an example of a print job input processing procedure of the secure print system 1.

FIG. 17 is a diagram illustrating an example of setting information 802.

FIG. 18 is a diagram illustrating an example of messages which are displayed on the printing apparatus 1000.

FIG. 22 is a diagram illustrating details of a job list 805.

FIG. 23 is a diagram illustrating details of an execution list 804.

FIG. 24 is a diagram illustrating details of a file system 501.

DESCRIPTION OF THE EMBODIMENTS

An exemplary embodiment of a secure print system according to the invention will be described in detail hereinbelow with reference to the drawings.

Figure 1:
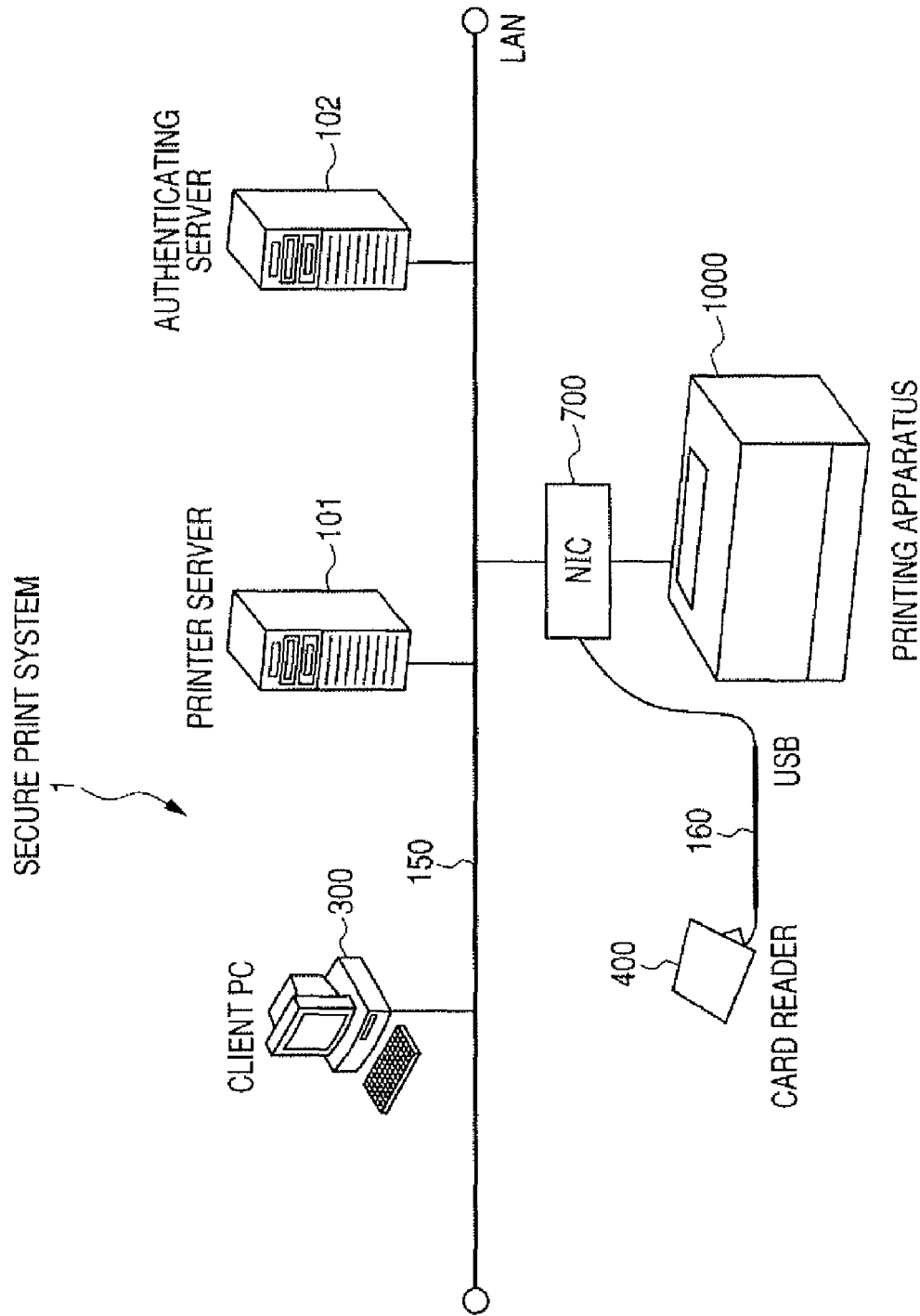
FIG. 1 is a diagram illustrating an example of a construction of a secure print system in the related art.

FIG. 1 is a diagram illustrating an example of a construction of a secure print system in the related art.

As illustrated in FIG. 1, for example, an NIC 700 connected to one or a plurality of printing apparatuses (image forming apparatuses) 1000 each of which is disposed every floor, one or a plurality of client PCs 300 (for example, one client PC is provided for an administrator, one client PC is provided for each user), one or a plurality of printer servers 101 (for example, the printer server is provided every base station), and one or a plurality of authenticating servers 102 (for example, the authenticating server is provided every base station) are connected through a LAN (local area network) 150. A card reader 400 is connected to the NIC 700 through a USB cable 160.

The client PC 300 is a PC for making a setting of the printing apparatus 1000. The client PC 300 is a PC having a function which can communicate with the printing apparatus 1000 through the LAN 150 by, for example, an HTTP (Hyper Text Transfer Protocol), a TCP/IP (Transmission Control Protocol/Internet Protocol), or the like. The client PC 300 is also a PC for the user to input a print job. When the user forms the print job through a printer driver from an application which operates on the client PC 300, the printer driver can transmit the print job to the printing apparatus 1000 and the printer server 101 by using a print protocol such as an LPR (Line PRinter Daemon Protocol) or the like.

The printer server 101 receives the print job from the client PC 300, analyzes the print job, obtains job information, and accumulates the print job. The printer server 101 also receives a print request from the printing apparatus 1000, searches for a job of the user from the accumulated jobs based on the user name included in the print request, and issues a print instruction of the found user's job to the printing apparatus 1000.

The authenticating server 102 is a server for the printing apparatus 1000 to make a user authentication. The authenticating server 102 has data such as user name, E-mail address, use authority, and the like associated with a card ID. The authenticating server 102 has a function for returning information indicative of the presence or absence of the user and its user information if the user exists in response to an inquiry from the printing apparatus 1000.

The card reader 400 is connected to the NIC 700 through the USB cable 160. When an IC card (for example, FeliCa (registered trademark) manufactured by Sony Corporation) is put over the card reader 400, the card reader reads information stored in the card and notifies the printing apparatus 1000 of it through the USB cable 160 and the NIC 700.

Subsequently, the secure print system 1 according to the invention will be described with reference to FIG. 2.

Figure 2:
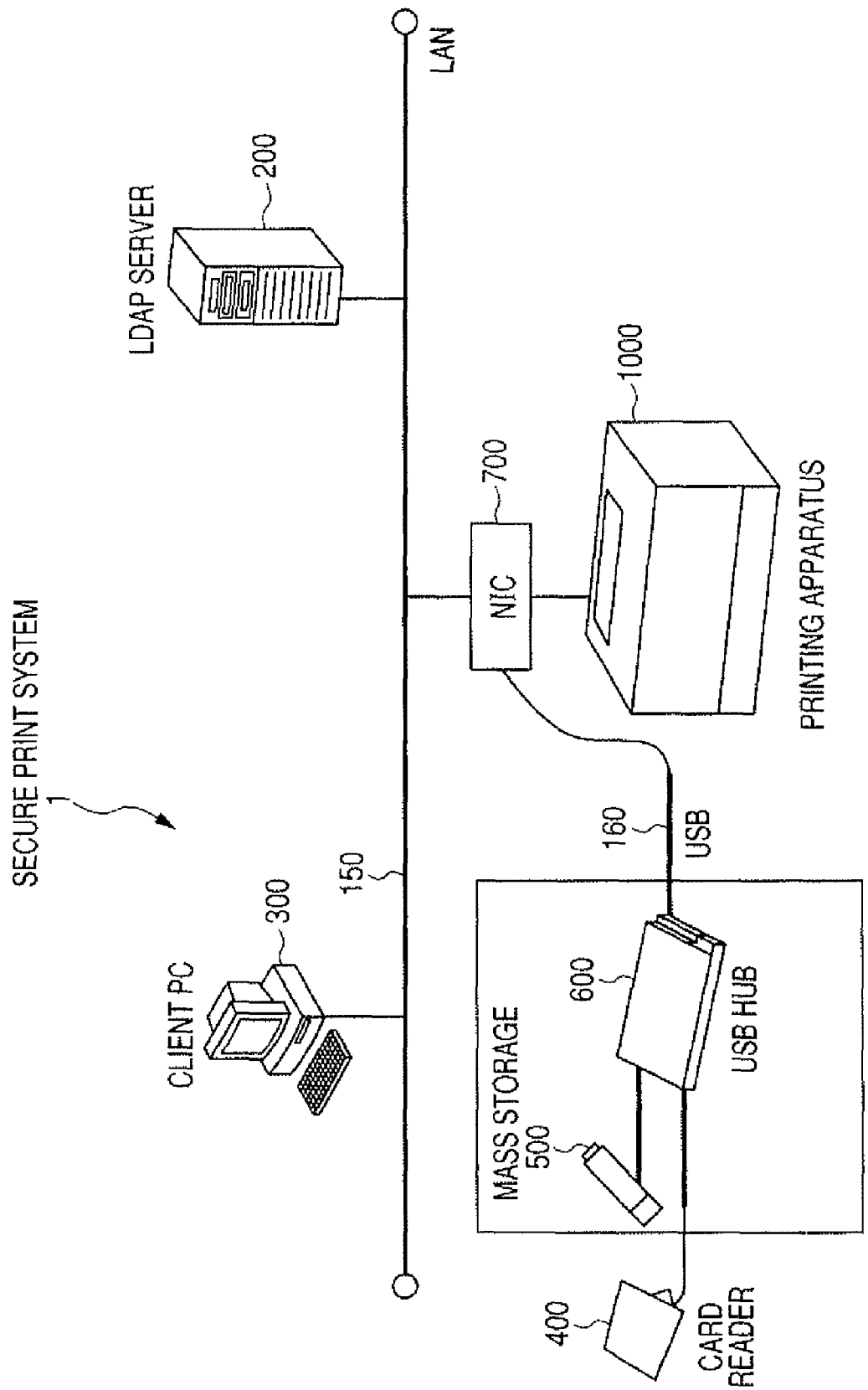
FIG. 2 is a diagram illustrating an example of a construction of a secure print system 1 according to the invention.

FIG. 2 is a diagram illustrating an example of a construction of the secure print system 1 according to the invention.

In the secure print system 1 illustrated in FIG. 2, the client PC (information processing apparatus) 300, an LDAP (Lightweight Directory Access Protocol) server (authenticating server) 200, and the NIC (Network Interface device) 700 are connected through the LAN 150. The NIC (Network Interface device) 700 is inserted into the printing apparatus 1000.

A mass storage (storage unit) 500 and the card reader 400 are connected to the NIC 700 through the USB cable 160 and a USB hub 600.

Although the mass storage 500 and the USB hub 600 have externally been attached to the printing apparatus 1000 through the NIC 700, they may be built in the printing apparatus 1000. If the NIC 700 has a plurality of USB ports, there is no need to use the USB hub 600 and the card reader 400 and the mass storage 500 are directly connected to the NIC 700.

The LDAP server 200 plays a role of the authenticating server 102 in FIG. 1 and has a function for communicating by the LDAP protocol. The LDAP server 200 can unitarily manage user information in an internal directory. The LDAP server 200 can be constructed by one server. The LDAP server 200 may be constructed by two servers, that is, a primary server and a secondary server as will be described hereinafter. The LDAP server 200 may be constructed by three or more servers. In any of those cases, it is assumed that when the LDAP server 200 is down, this means that all servers constructing the LDAP server 200 are down. Although the LDAP server 200 is used in FIG. 2, the invention is not limited to the LDAP server but can use any server so long as it can be authenticated.

The client PC 300 is an information processing apparatus for producing print data.

The mass storage 500 is hardware having a file system of a large memory capacity such as HDD (Hard Disk Drive) or flash memory and is connected to the USB hub 600 through the USB cable 160.

In the mass storage 500, control of the file system such as writing, reading, deletion, or the like of a file into/from the printing apparatus 1000 can be made.

Subsequently, the client PC 300, LDAP server 200, printing apparatus 1000, and NIC 700 will be described with reference to FIGS. 3, 4, and 5.

Figure 3:
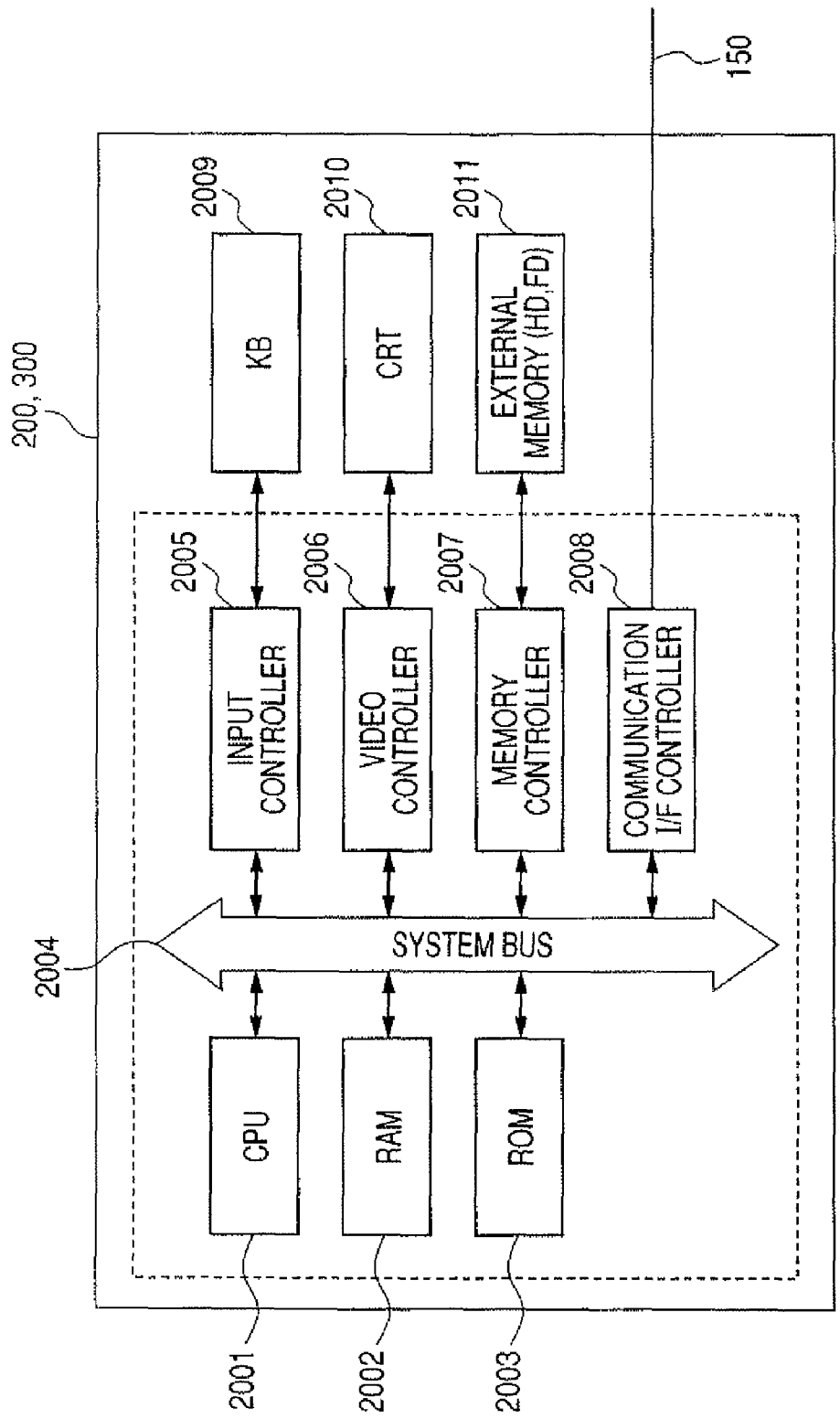
FIG. 3 is a diagram illustrating a hardware construction of an LDAP server 200 and a client PC 300.

FIG. 3 is a diagram illustrating a hardware construction of the LDAP server 200 and the client PC 300. FIG. 4 is a diagram illustrating a hardware construction of the printing apparatus 1000. FIG. 5 is a diagram illustrating a hardware construction of the NIC 700.

As illustrated in FIG. 3, in the LDAP server 200 and the client PC 300, a CPU (Central Processing Unit) 2001, a RAM (Random Access Memory) 2002, a ROM (Read Only Memory) 2003, an input controller 2005, a video controller 2006, a memory controller 2007, and a communication I/F controller 2008 are connected through a system bus 2004.

The CPU 2001 integratedly controls each device and each controller connected to the system bus 2004.

A BIOS (Basic Input/Output System) and an OS (Operating System) serving as control programs of the CPU 2001, various kinds of programs which are executed by each server or each PC, and the like have been held in the ROM 2003 or an external memory 2011.

The RAM 2002 functions as a main memory, a work area, or the like of the CPU 2001. The CPU 2001 loads the program and the like which are necessary upon execution of the processes from the ROM 2003 or the external memory 2011 into the RAM 2002 and executes the loaded program, thereby realizing various kinds of operations.

The input controller 2005 controls an input from a keyboard (KB) 2009, a pointing device such as a mouse (not shown), or the like.

The video controller 2006 controls a display to a display device such as a CRT (Cathode Ray Tube) 2010. The display device is not limited to the CRT but may be another display device such as a liquid crystal display. The administrator uses those component elements as necessary.

The memory controller 2007 controls an access to the external memory 2011 such as hard disk (HD) for storing a boot program, various kinds of applications, font data, a user file, an edition file, various kinds of data, and the like, flexible disk (FD), or compact flash (registered trademark) memory which is connected to a PCMCIA (Personal Computer Memory Card International Association) card slot through an adapter.

The communication I/F controller 2008 is connected to an external apparatus through a network such as a LAN 150, communicates with the external apparatus, and executes a communication control process on the network. The communication I/F controller 2008 can make communication using, for example, the TCP/IP (Transmission Control Protocol/Internet Protocol).

By executing, for example, a developing (rasterizing) process of an outline font into an area for display information in the RAM 2002, the CPU 2001 can display it onto the CRT 2010. The CPU 2001 also enables the user to instruct by using a mouse cursor (not shown) on the CRT 2010 or the like.

The various kinds of programs which operate on the hardware of the LDAP server 200 and the client PC 300 have been recorded in the external memory 2011 and are loaded into the RAM 2002 and executed by the CPU 2001 as necessary. A definition file, various kinds of information tables, and the like which are used upon execution of the program have been stored in the external memory 2011.

Subsequently, a hardware construction of the printing apparatus 1000 will be described.

Figure 4:
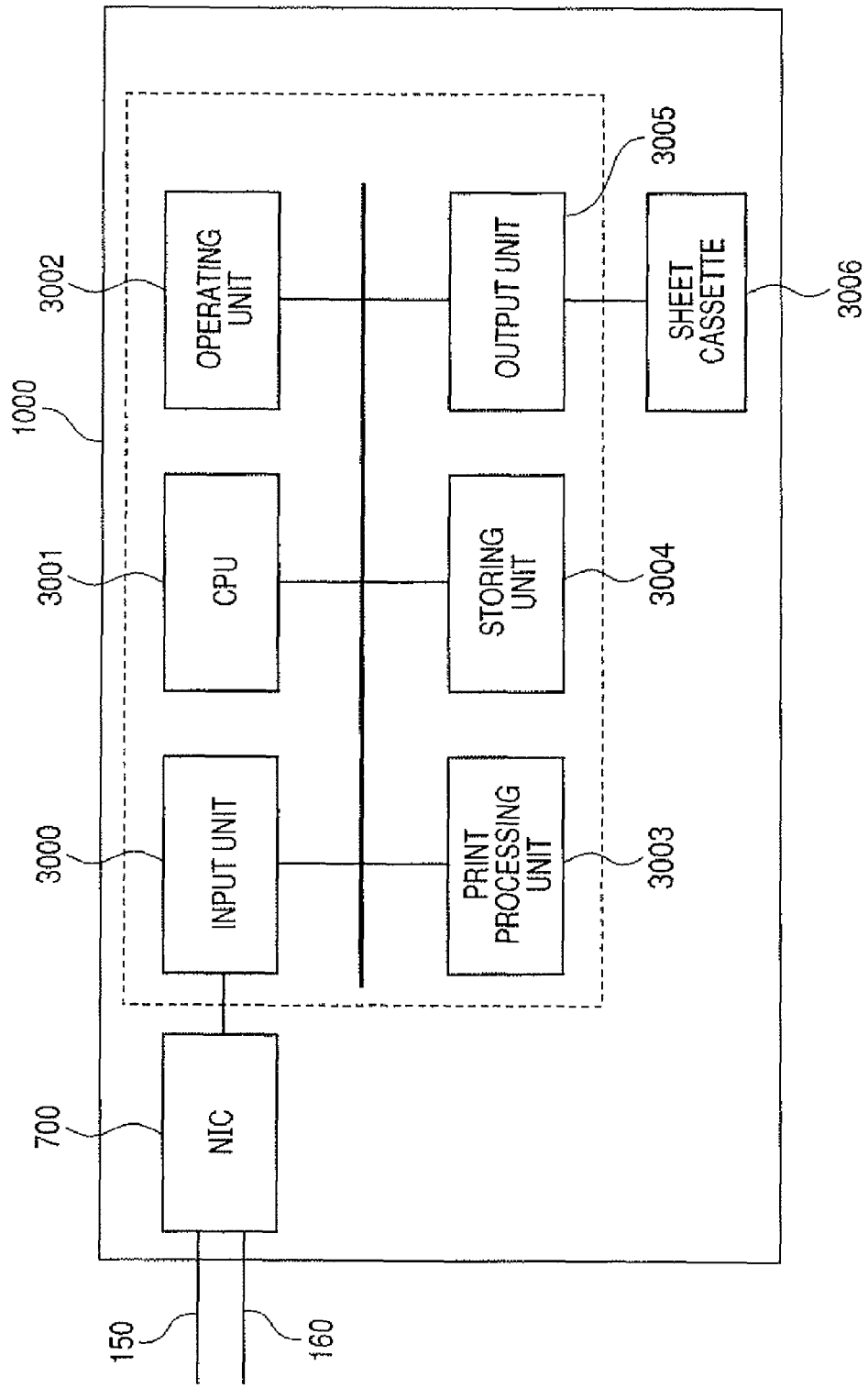
FIG. 4 is a diagram illustrating a hardware construction of a printing apparatus 1000.

As illustrated in FIG. 4, the printing apparatus 1000 has an input unit 3000, a CPU 3001, an operating unit 3002, a print processing unit 3003, a storing unit 3004, an output unit 3005, a sheet cassette 3006, and the like.

The input unit 3000 connects the printing apparatus and the NIC 700 and controls data communication with the NIC 700.

The CPU 3001 controls the whole operation of the printing apparatus 1000.

The operating unit 3002 directly provides an interface of the operation which is executed by the user to the printing apparatus 1000.

The print processing unit 3003 performs an analysis of a command received by the input unit 3000, an analysis of the print data (PDL), or the like.

The storing unit 3004 is constructed by a ROM (not shown) for making the printing apparatus 1000 operative, a RAM (not shown), a secondary storing device (not shown), and the like. The RAM is a data storing area having no use restriction and is used as a reception buffer of the input unit 3000 or used for data development or the like in the print processing unit 3003.

The print data received by the input unit 3000 is developed into image information which can be printed by the print processing unit 3003. The output unit 3005 transfers the image information onto paper.

The sheet cassette 3006 supplies a proper sheet according to the process in the output unit 3005.

The NIC 700 is a network interface card. The NIC 700 receives, as a window, the data received from another apparatus through the LAN 150 and transfers to a program (not shown) in the NIC or to the input unit 3000 of the printing apparatus 1000.

Subsequently, a hardware construction of the NIC 700 will be described.

Figure 5:
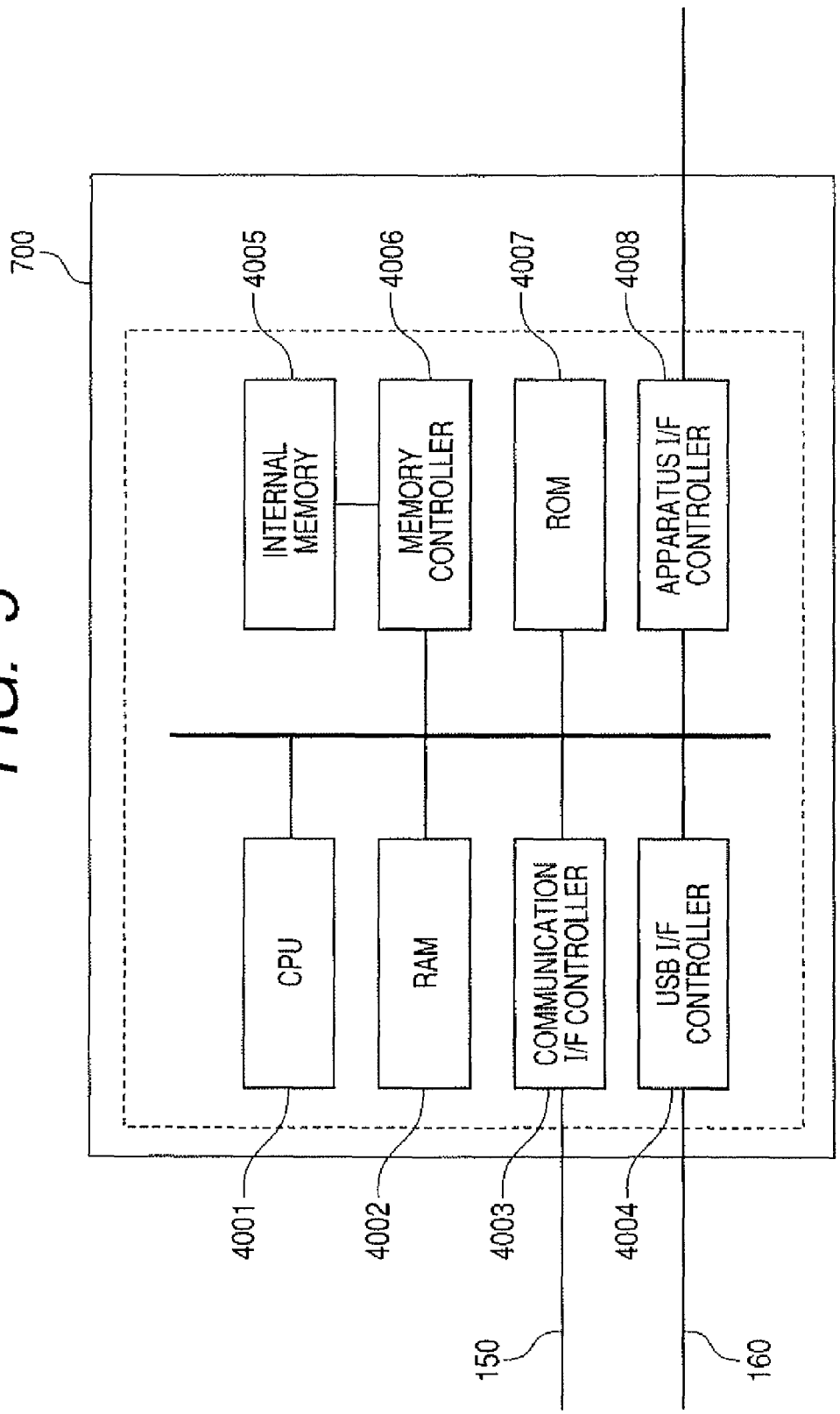
FIG. 5 is a diagram illustrating a hardware construction of an NIC 700.

As illustrated in FIG. 5, the NIC 700 has a CPU 4001, a RAM 4002, a communication I/F controller 4003, a USB I/F controller 4004, an internal memory 4005, a memory controller 4006, a ROM 4007, an apparatus I/F controller 4008, and the like.

The CPU 4001 controls the NIC 700 and controls the apparatuses connected therein.

The RAM 4002 functions as a main memory, a work area, or the like of the CPU 4001. The CPU 4001 loads the program and the like which are necessary upon execution of the processes from the ROM 4007 or the internal memory 4005 into the RAM 4002 and executes the loaded program.

The communication I/F controller 4003 is connected to an external apparatus through the network such as a LAN 150, communicates with the external apparatus, and executes a communication control process on the network. The communication I/F controller 4003 can make communication using a communication protocol such as TCP/IP or UDP (User Datagram Protocol).

The USB I/F controller 4004 connects USB apparatuses such as card reader 400, mass storage 500, and USB hub 600 and the NIC 700 so as to communicate between them, and executes a communication control process of the USB.

An OS for controlling the NIC 700 has been installed in the internal memory 4005. An application program which operates on the OS and its setting information are also stored in the internal memory 4005.

The memory controller 4006 controls an access to the internal memory 4005 in which various kinds of applications, various kinds of data, and the like have been stored.

The ROM 4007 is a read only semiconductor memory. The boot program is stored in the ROM 4007 because its contents are not deleted even when a power source is turned off.

The apparatus I/F controller 4008 connects the NIC 700 and the printing apparatus 1000 so as to communicate between them.

Subsequently, an outline of the processes of the secure print system 1 according to the invention will be described with reference to FIG. 6.

Figure 6:
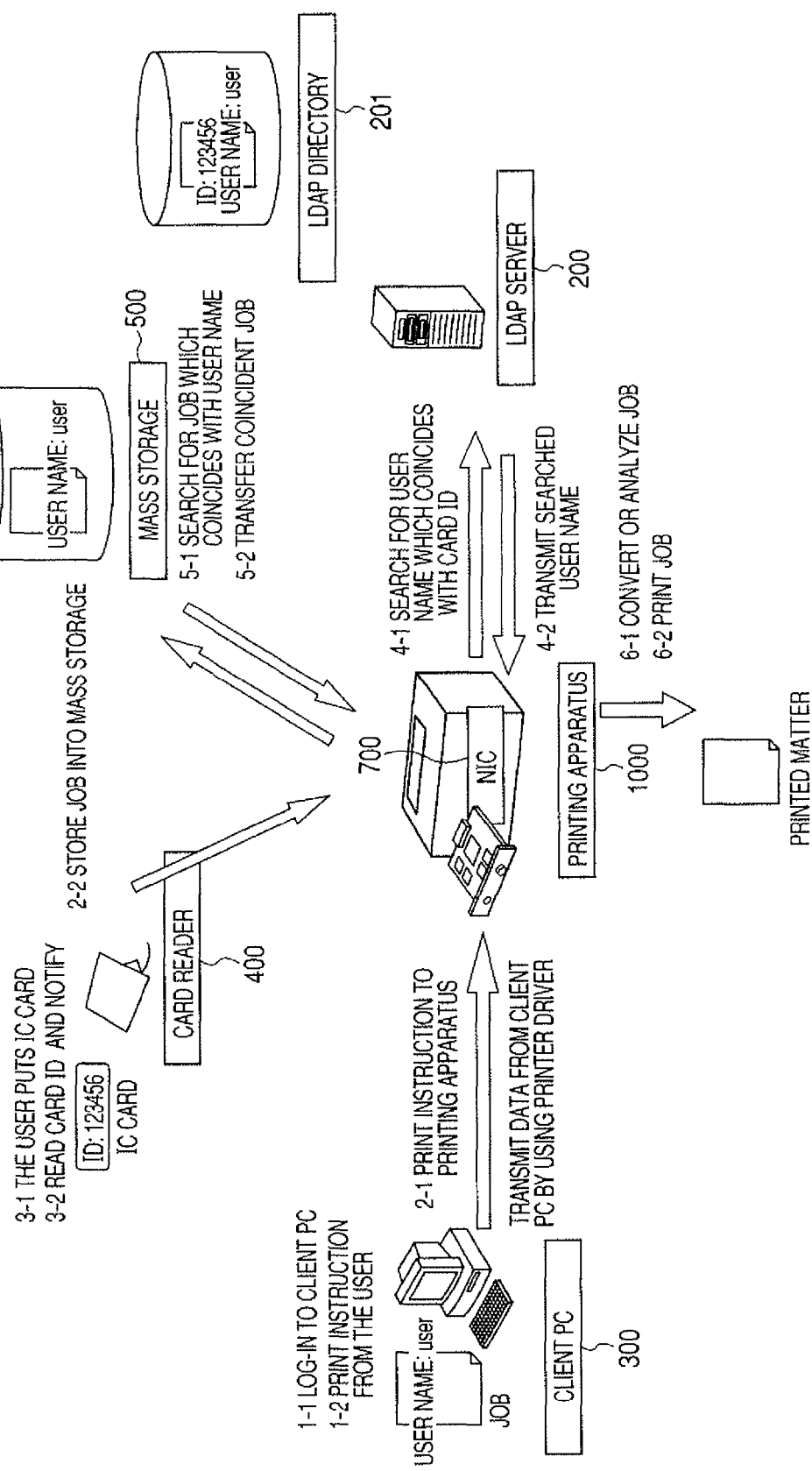
FIG. 6 is a diagram illustrating an outline of processes of the secure print system 1.

FIG. 6 is a diagram illustrating the outline of the processes of the secure print system 1.

The user logs in the client PC 300 (step 1-1) and instructs a printing of the data (step 1-2).

The client PC 300 produces a job from the data and transmits to the printing apparatus 1000 (step 2-1).

The NIC 700 attached to the printing apparatus 1000 receives the job and stores into the mass storage 500 (step 2-2).

The user who has instructed the printing puts the IC card 410 over the card reader 400 (step 3-1).

The card reader 400 reads a card ID 211 from the IC card 410 and notifies the printing apparatus 1000 of it (step 3-2).

The NIC 700 attached to the printing apparatus 1000 inquires of the LDAP server 200 about the user name which coincides with the received card ID 211 (step 4-1).

The LDAP server 200 searches the LDAP directory 201 and transmits the searched user name to the NIC 700 (step 4-2).

The NIC 700 obtains the job which coincides with the user name from the mass storage 500 (step 5-1) and transmits the job to the printing apparatus 1000 (step 5-2). At this time, if the user has a color authority, the job is transferred as it is to the printing apparatus 1000. If the user does not have the color authority, the forced monochrome conversion of the job or an analysis of the job is executed according to the setting (step 6-1). The printing apparatus 1000 prints the received job and outputs (step 6-2).

Subsequently, functions of the secure print system 1 and data which is used will be described with reference to FIGS. 7A, 7B, 17, 19, 20, 21, 22, 23, 24, 25, 26, and 27.

Figure 7:
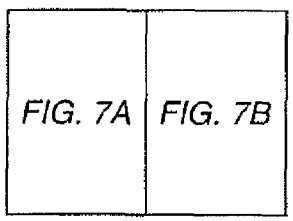
FIG. 7 is comprised of FIGS. 7A and 7B showing block diagrams illustrating a function construction of the secure print system 1.
Figure 7A:
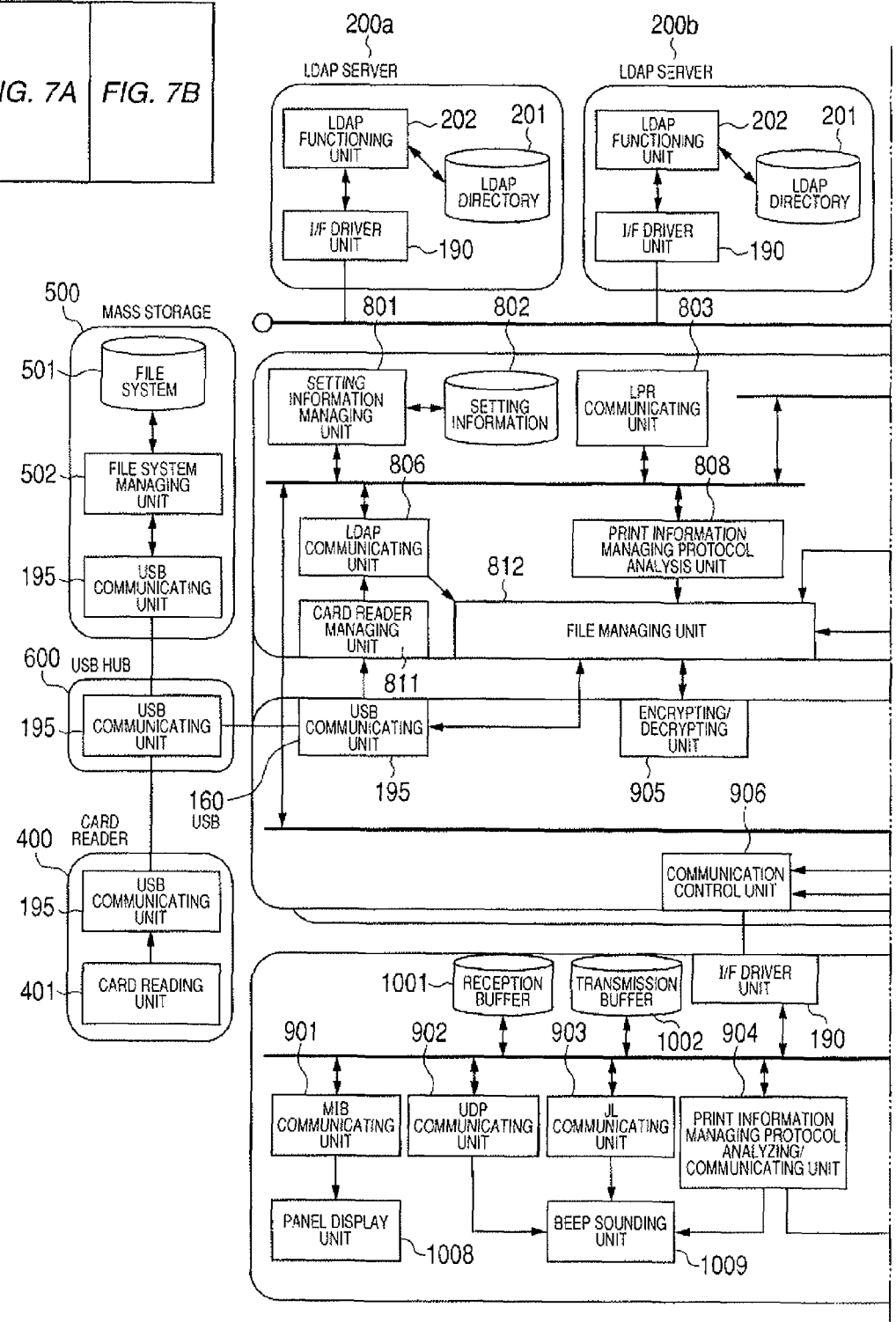
Figure 7B:
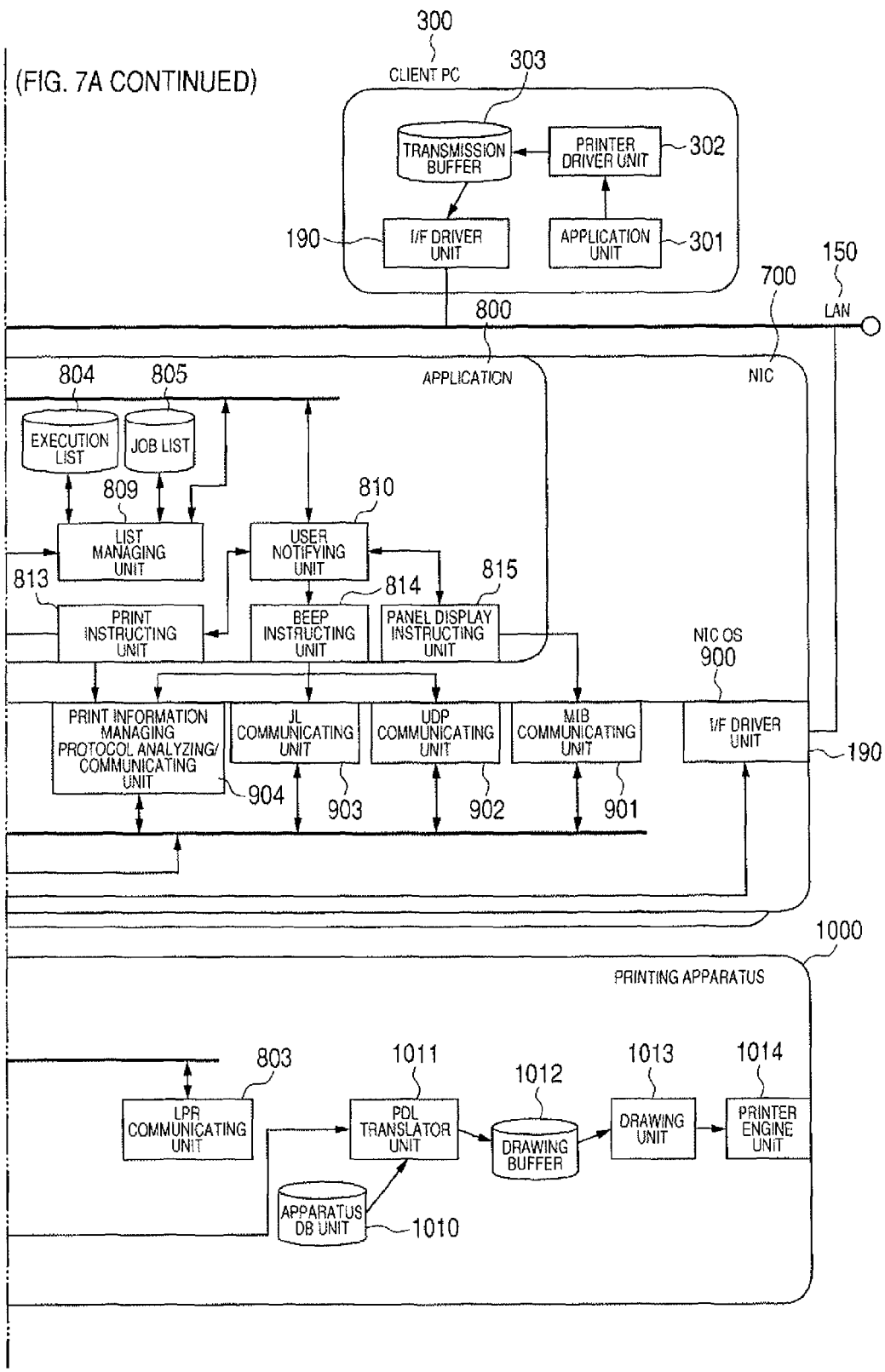
Figures 19, 20, 21:
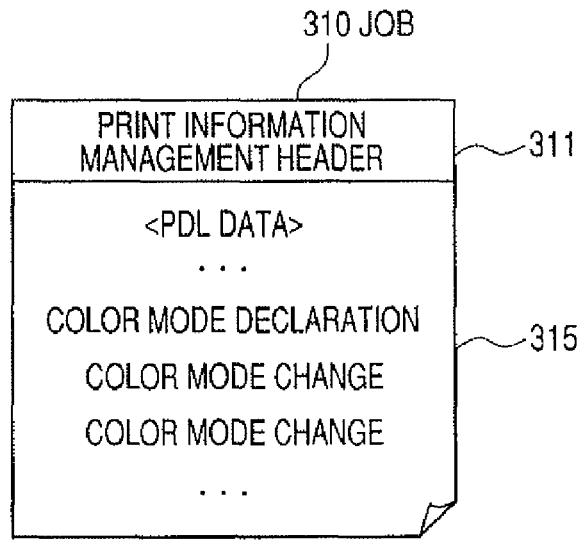
FIG. 19 is a diagram illustrating details of a job 310.
FIG. 20 is a diagram illustrating details of a print information management header 311.
FIG. 21 is a diagram illustrating details of job information 820.
Figures 25, 26:
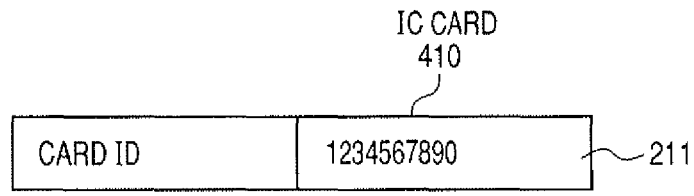
FIG. 25 is a diagram illustrating details of an IC card 410.
FIG. 26 is a diagram illustrating an example of user information 210.
Figure 27:
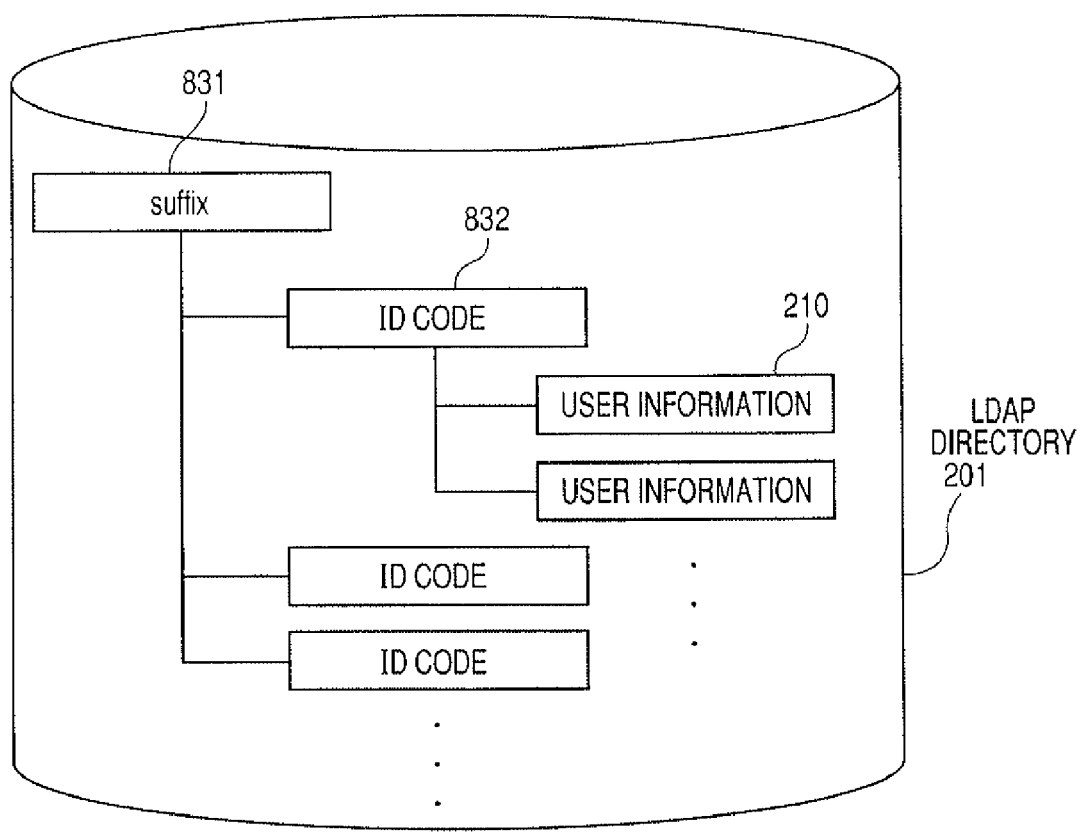
FIG. 27 is a diagram illustrating details of an LDAP directory 201.

FIGS. 7A and 7B are block diagrams illustrating a function construction of the secure print system 1 according to the invention. FIG. 17 is a diagram illustrating an example of setting information 802. FIG. 19 is a diagram illustrating details of a job 310. FIG. 20 is a diagram illustrating details of a print information management header 311. FIG. 21 is a diagram illustrating details of job information 820. FIG. 22 is a diagram illustrating details of a job list 805. FIG. 23 is a diagram illustrating details of an execution list 804. FIG. 24 is a diagram illustrating details of a file system 501. FIG. 25 is a diagram illustrating details of the IC card 410. FIG. 26 is a diagram illustrating an example of user information 210. FIG. 27 is a diagram illustrating details of an LDAP directory 201.

In the secure print system 1, the LDAP server 200 and the client PC 300 and the NIC 700 attached to the printing apparatus 1000 are connected through the LAN 150 which can make bidirectional communication. The mass storage 500, USB hub 600, and card reader 400 are connected to the NIC 700 through the USB cable 160 which can make USB communication.

The LDAP server 200 has the LDAP directory 201, an LDAP functioning unit 202, an I/F driver unit 190, and the like. The LDAP server 200 can have a redundancy construction and a plurality of LDAP servers may be provided.

Since the LDAP server 200 has a role of searching for the user information in the system, the invention is not limited to the LDAP server but any server may be used so long as it has the storing and searching functions of the user information.

Data illustrated in FIG. 27 has been stored in the LDAP directory 201.

One or a plurality of identification (ID) codes are arranged under a most significant unit "Suffix" adapted to collect a data group. Further, one or a plurality of user information 210 is stored under the ID code.

Generally, the ID code is constructed by an OU (Organization Unit).

In Active Directory (registered trademark), "Suffix" corresponds to a unit called a domain.

As illustrated in FIG. 26, the user information 210 has the card ID 211, a user name 212, a password 213, a sub-user 1 (214), a sub-user 2 (215), a sub-user 3 (216), a sub-user 4 (217), a use restriction 218, a color restricting mode 219, a post-analysis print mode 220, and the like.

As illustrated in FIG. 25, the card ID 211 is used to register an ID of the IC card 410 of the user and has a value which is unique in a group of user information 210 included under "Suffix" in the LDAP directory 201.

The user name 212 is a name of the user who holds the IC card 410 which coincides with the card ID 211.

The password 213 is stored in order to make an identification when authenticating the user.

Each of the sub-users 1 to 4 (214 to 217) is a name different from the main user name 212 which is ordinarily used by the user and each sub-user is a user name which is used when the user acts as a proxy for another user.

Restriction information in the case of using the printing apparatus 1000 has been stored in the use restriction 218.

The color restricting mode 219 and the post-analysis print mode 220 are information which is necessary when making a color restriction of the print job of the user.

The LDAP functioning unit 202 performs a connection of the communication, an authentication, a search, a change, an addition, a deletion, a disconnection, or the like according to the LDAP protocol.

In the connection, a logical communication path is assured for the client who issued a connecting request.

In the authentication, the user name of the user who issued an authenticating request is searched for from the LDAP directory 201, a collation of the password is made, and an authentication result is returned.

In the search, the corresponding user is searched for from the LDAP directory 201 based on a value subjected to a searching request and the coincident user information 210 is returned.

The client PC 300 has an application unit 301, a printer driver unit 302, a transmission buffer 303, the I/F driver unit 190, and the like.

The I/F driver unit 190 is connected to the external apparatus through the network such as a LAN 150, communicates with the external apparatus, and controls the communication according to the communication protocol such as TCP/IP or UDP.

The application unit 301 provides a graphic user interface to the user and forms image data according to a purpose of the user.

The printer driver unit 302 converts the image data formed by the application unit 301 into page description language (PDL) data which can be printed by the printing apparatus 1000. At this time, in order to enable a color attribute which is output from the printing apparatus 1000 to be identified, color mode declaration/color mode change are described in PDL data 315 as illustrated in FIG. 19. Specifically speaking, as for the PDL data, the data is constructed every page of the printed matter. The color mode declaration is described in the first page and the color attribute (color/monochromatic) has been set. The declaration indicates whether the subsequent pages are color pages or monochromatic pages. If the color attribute is changed in the subsequent pages, a color mode change header is added to the head of the page in which the color attribute has been changed and the changed color attribute (color/monochromatic) is set.

Further, the print information management header 311 including the job information such as job owner 312, job name 313, and color mode 314 is added to the PDL data as illustrated in FIG. 20, thereby forming the job 310 illustrated in FIG. 19. There is also a printer driver in which the color mode 314 is not set into the print information management header 311 in dependence on the kind of printer driver. For example, in a printer driver for a monochromatic printer, since the formed print data is naturally monochromatic data, the color mode 314 is not set. As for the color mode 314, three kinds of modes such as color/monochromatic/automatic can be set. However, generally, since the printing apparatus 1000 is constructed so as to discriminate the color attribute by the color mode declaration/color mode change in the PDL data 315, the printer driver unit 302 sets "automatic" into the color mode 314 of the print information management header 311. Therefore, whether the job is a color job or a monochromatic job cannot be discriminated only by the information of the color mode 314. However, since the printing apparatus 1000 preferentially uses the information of the print information management header 311 more than the information of the PDL data 315, after the printer driver unit 302 formed the job, by rewriting the color mode 314 of the print information management header 311, the job which is output can be forcedly converted into the monochromatic job or the color job.

The transmission buffer 303 temporarily stores the job 310 formed by the printer driver unit 302 and realizes a spool.

The USB hub 600 has a USB communicating unit 195 and the like. The USB hub 600 relays USB data and transfers USB data of the apparatus connected to the USB hub 600 to each of the other apparatuses.

The USB communicating unit 195 makes data communication such as control transfer, interruption transfer, bulk transfer, or isochronous transfer according to the USB specifications. Execution of the data transfer is a necessary condition and a transfer speed, a USB version, and the like are not limited.

The mass storage 500 has the file system 501, a file system managing unit 502, the USB communicating unit 195, and the like.

As illustrated in FIG. 24, the file system 501 stores the job 310 into an internal storing device (not shown). The file system 501 also executes a writing, a reading, or a deletion of the job 310.

The card reader 400 has the USB communicating unit 195, a card reading unit 401, and the like.

The card reading unit 401 reads the card ID 211 from the IC card 410. When the IC card 410 is put over the card reader 400, the card reading unit 401 reads the information such as a card ID 211 and the like from the IC card 410 and transmits to other apparatuses connected through the USB communicating unit 195.

The NIC 700 has an application 800, an NIC OS 900, and the like.

The application 800 is a program which operates on the NIC OS 900.

Simultaneously with the control of the NIC 700, the NIC OS 900 performs a management of the application 800 on the NIC 700, various kinds of instructions to the printing apparatus 1000, and the like.

The application 800 of the NIC 700 has a setting information managing unit 801, the setting information 802, an LPR communicating unit 803, the execution list 804, the job list 805, an LDAP communicating unit 806, a print information managing protocol analyzing unit 808, a list managing unit 809, a user notifying unit 810, a card reader managing unit 811, a file managing unit 812, a print instructing unit 813, a beep instructing unit 814, a panel display instructing unit 815, and the like.

The setting information managing unit 801 manages the setting information 802 necessary for execution of the application 800 and writes and reads out the setting information 802.

When the client PC 300 accesses the application 800 by using a browser and sets the setting information of the application 800 and the application 800 receives an instruction from the client PC 300, the setting information managing unit 801 holds the set data as setting information 802.

As illustrated in FIG. 17, the setting information 802 has Suffix 831, an identification (ID) code 832, a primary server 833, a primary port 834, a secondary server 835, a secondary port 836, a user 837, a password 838, a color restricting mode 839, a post-analysis print mode 840, and the like.

Suffix 831 and the ID code 832 become conditions for designating a searching location when the searching request is issued to the LDAP server 200.

The primary server 833, primary port 834, secondary server 835, and secondary port 836 are information for connecting to the LDAP server 200. Since the LDAP server 200 can have the redundancy construction, a plurality of LDAP servers can be set like a primary server and a secondary server.

The user 837 and the password 838 are information necessary when issuing the authenticating request to the LDAP server 200.

The color restricting mode 839 and the post-analysis print mode 840 are information necessary when performing the color restriction. When a change of the color restricting mode 839 and the post-analysis print mode 840 is instructed through the browser, the CPU 4001 of the NIC 700 can change the setting of the color restricting mode 839 or can change the setting of the post-analysis print mode 840 (switching unit).

The LPR communicating unit 803 analyzes an LPR print protocol and communicates. The LPR communicating unit 803 analyzes the protocol at the time of receiving the job 310 from the client PC 300 and communicates. Although the LPR has been shown as an example here, the invention is not limited to the LPR in particular but any protocol may be used so long as it is a print protocol.

The execution list 804 is as illustrated in FIG. 23 and is a sub-set of the job list 805 illustrated in FIG. 22. When executing the printing, the printing is instructed based on the job information 820 stored in the execution list 804.

The job list 805 is constructed by the job information 820 illustrated in FIG. 21. The job information 820 is information obtained by extracting the information necessary to manage the job 310 and has a user name 821, a file name 822, a job name 823, a time stamp 824, and the like. The job list 805 holds the information of all of the jobs 310 stored in the file system 501.

The LDAP communicating unit 806 communicates with the LDAP server 200 according to the LDAP protocol and is connected to the LDAP server 200 designated by the primary server 833 and the primary port 834 in the setting information 802.

The LDAP communicating unit 806 makes an authentication by using the user 837 and the password 838 in the setting information 802. The LDAP communicating unit 806 searches for the user information 210 (FIG. 26) associated with the card ID 211 by using the Suffix 831 and the ID code 832 in the setting information 802 as searching locations. If the LDAP communicating unit 806 cannot be connected to the designated primary LDAP server 200 designated above, the LDAP communicating unit 806 is connected to the LDAP server 200 designated by the secondary server 835 and the secondary port 836 in the setting information 802. Therefore, a redundancy construction in which even if the primary LDAP server 200 is down, the communication can be made is realized.

The print information managing protocol analyzing unit 808 analyzes the print information management header 311 included in the job 310. The print information management header 311 is binary data which is added to the head of the PDL data and various kinds of information are included in the header 311.

When the job owner 312 and the job name 313 included in the print information management header 311 are obtained and the job information 820 is formed, the value analyzed in the print information managing protocol analyzing unit 808 is used.

The list managing unit 809 manages the execution list 804 and the job list 805. When the job 310 is written in the file system 501, the list managing unit 809 receives the job information 820 from the file managing unit 812, adds it to the job list 805, and manages. The list managing unit 809 extracts the job information 820 which coincides with the user name transferred from the LDAP communicating unit 806 from the job list 805, thereby forming the execution list 804. The list managing unit 809 receives a notification from the file managing unit 812 upon completion of the printing and deletes the corresponding job information 820 from the job list 805.

The user notifying unit 810 notifies the user who uses the printing apparatus 1000 of an error or the like. The user notifying unit 810 has a function for issuing a beep instruction to the NIC OS 900 so as to generate a beep sound from the printing apparatus 1000, thereby appealing to the hearing sense of the user, or issuing a panel displaying instruction so as to display arbitrary characters onto a panel of the printing apparatus 1000, thereby appealing to the sense of sight of the user.

The card reader managing unit 811 controls the card reader 400 connected to the NIC 700 through the USB cable 160. When the IC card 410 is put over the card reader 400, the card reader managing unit 811 obtains the card ID 211.

The file managing unit 812 manages the job 310 in the application 800. The file managing unit 812 encrypts the job 310 and stores into the file system 501, or decrypts the job 310 and transmits the job 310 to the print instructing unit 813, or deletes the corresponding job 310 from the file system 501 at timing when the input of the job into the print instructing unit 813 has been finished.

For the decrypted job 310 sent from the file managing unit 812, the print instructing unit 813 issues the print instruction to the NIC OS 900 by using a print information managing protocol.

The beep instructing unit 814 receives the beep instruction from the user notifying unit 810 and notifies the NIC OS 900 of it. With respect to the beep sound, although the beep generation can be realized by various kinds of methods such as print information managing protocol, JL, and UDP, the functions which are supported differ depending on the printing apparatus 1000. The beep instructing unit 814 absorbs the difference caused by the type of printing apparatus 1000 and makes a proper beep instruction.

The panel display instructing unit 815 allows an arbitrary message to be displayed onto the panel (not shown) of the printing apparatus 1000 by using an MIB (Management Information Base). In the case of the printing apparatus 1000 of such a type that the message cannot be displayed for a predetermined time, after the message was displayed for a few seconds, the display is reset.

Subsequently, details of the NIC OS 900 will be described.

The NIC OS 900 has the I/F driver unit 190, the USB communicating unit 195, an encrypting/decrypting unit 905, a print information managing protocol analyzing/communicating unit 904, a JL communicating unit 903, a UDP communicating unit 902, an MIB communicating unit 901, and a communication control unit 906.

The encrypting/decrypting unit 905 encrypts and decrypts the data. An encrypting format is not fixed but a block encryption such as DES (Data Encryption Standard), triple DES, or AES (Advanced Encryption Standard), a stream encryption such as RC4, and the like can be performed.

The print information managing protocol analyzing/communicating unit 904 makes data communication according to the print information managing protocol. The print information managing protocol is a communicating protocol for controlling the printing apparatus 1000 and can perform the print instruction, beep sound generation, and the like.

The JL communicating unit 903 is provided to make JL communication. JL denotes a job control language and can perform an instruction to obtain the information of the printing apparatus 1000, an instruction to receive the PDL data, the beep instruction to the printing apparatus 1000, or the like.

The UDP communicating unit 903 makes UDP communication. A DNS (Domain Name System) query, the beep instruction, or the like can be performed by using the UDP communication.

The MIB communicating unit 901 is provided to make MIB communication. MIB denotes a protocol for managing a communicating apparatus and performs the display on the panel of the printing apparatus 1000, or the like.

The communication control unit 906 notifies the application 800 of the data received from the I/F driver unit 190 or transmits it to the printing apparatus 1000. The communication control unit 906 transfers the data transmitted to the NIC 700 through the LAN 150 to the application 800 and transfers the data transmitted from the application 800 to the printing apparatus 1000.

Subsequently, the printing apparatus 1000 will be described.

The printing apparatus 1000 has the I/F driver unit 190, a reception buffer 1001, a transmission buffer 1002, the MIB communicating unit 901, the UDP communicating unit 902, the JL communicating unit 903, the print information managing protocol analyzing/communicating unit 904, the LPR communicating unit 803, a panel display unit 1008, a beep sounding unit 1009, a PDL translator unit 1011, an apparatus DB unit 1010, a drawing buffer 1012, a drawing unit 1013, and a printer engine unit 1014.

The reception buffer 1001 temporarily stores all of the data received by the I/F driver unit 190 and becomes a buffer material of a processing delay.

The transmission buffer 1002 temporarily stores all of the data before it is transmitted to the I/F driver unit 190 and becomes a buffer material of a processing delay.

The panel display unit 1008 displays the designated message onto the panel of the printing apparatus 1000.

The beep sounding unit 1009 makes a sounding apparatus (not shown) built in the printing apparatus 1000 operative, thereby generating a sound.

The apparatus DB unit 1010 stores the information of the printing apparatus 1000 set by the JL and provides the information to the PDL translator unit 1011. The information mentioned here indicates, for example, the number of print sheets.

The PDL translator unit 1011 executes a translating process of the PDL data and converts into intermediate data serving as a drawing object suitable for drawing.

The drawing buffer 1012 temporarily stores the intermediate data as a drawing object formed by the PDL translator unit 1011 until the printing is actually executed.

The drawing unit 1013 actually draws the drawing object temporarily stored in the drawing buffer 1012, thereby forming image data serving as a bitmap image.

The printer engine unit 1014 receives the bitmap image formed by the drawing unit 1013 and prints onto a media such as a sheet or the like by the well-known printing technique.

Subsequently, detailed processes of the secure print system 1 according to the invention will be described with reference to FIGS. 8, 9, 10, 11, 12, 13, 14, 15, 16, and 18.

Figure 9:
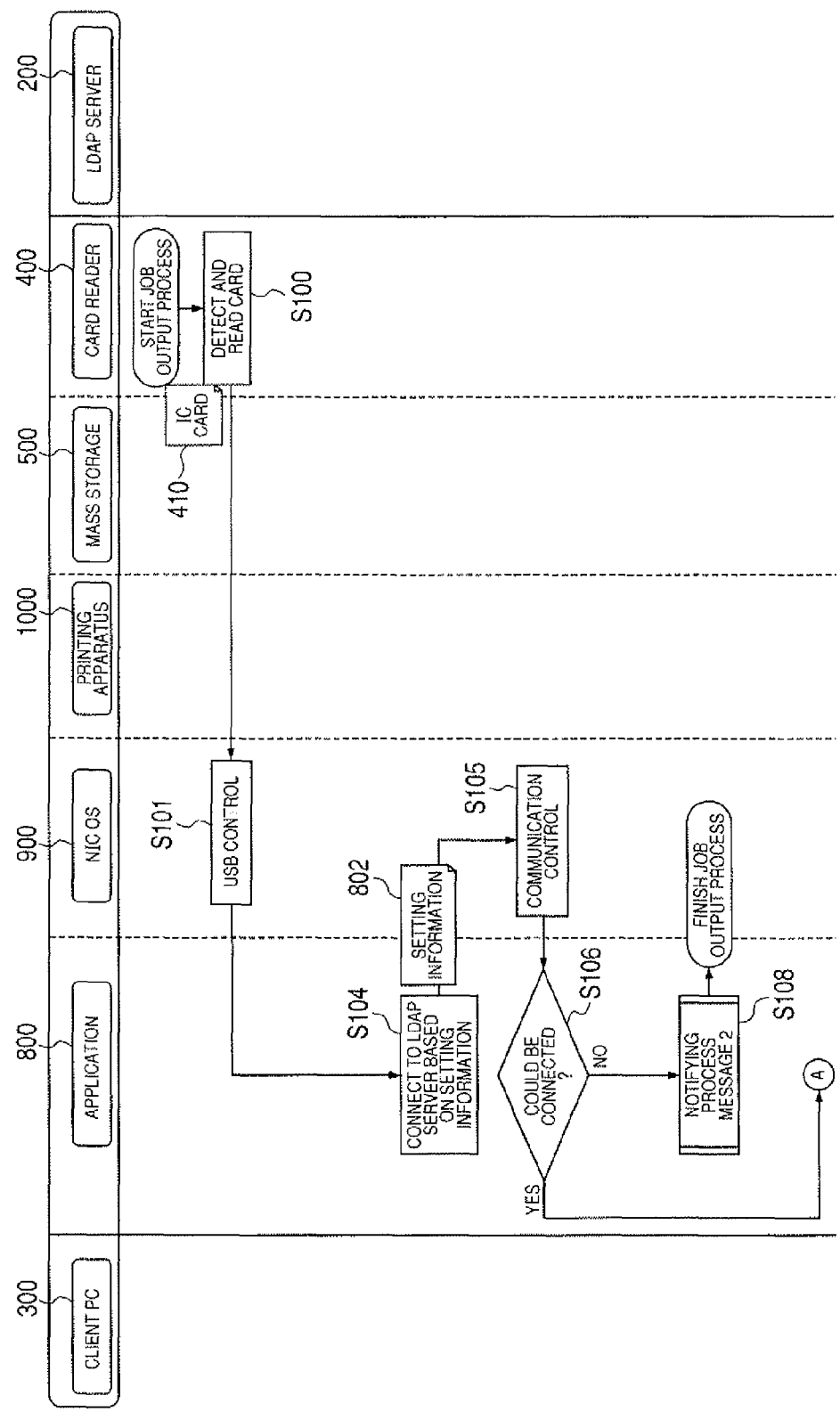
FIG. 9 is a flowchart illustrating an example of a print job output processing procedure of the secure print system 1.
Figure 10:
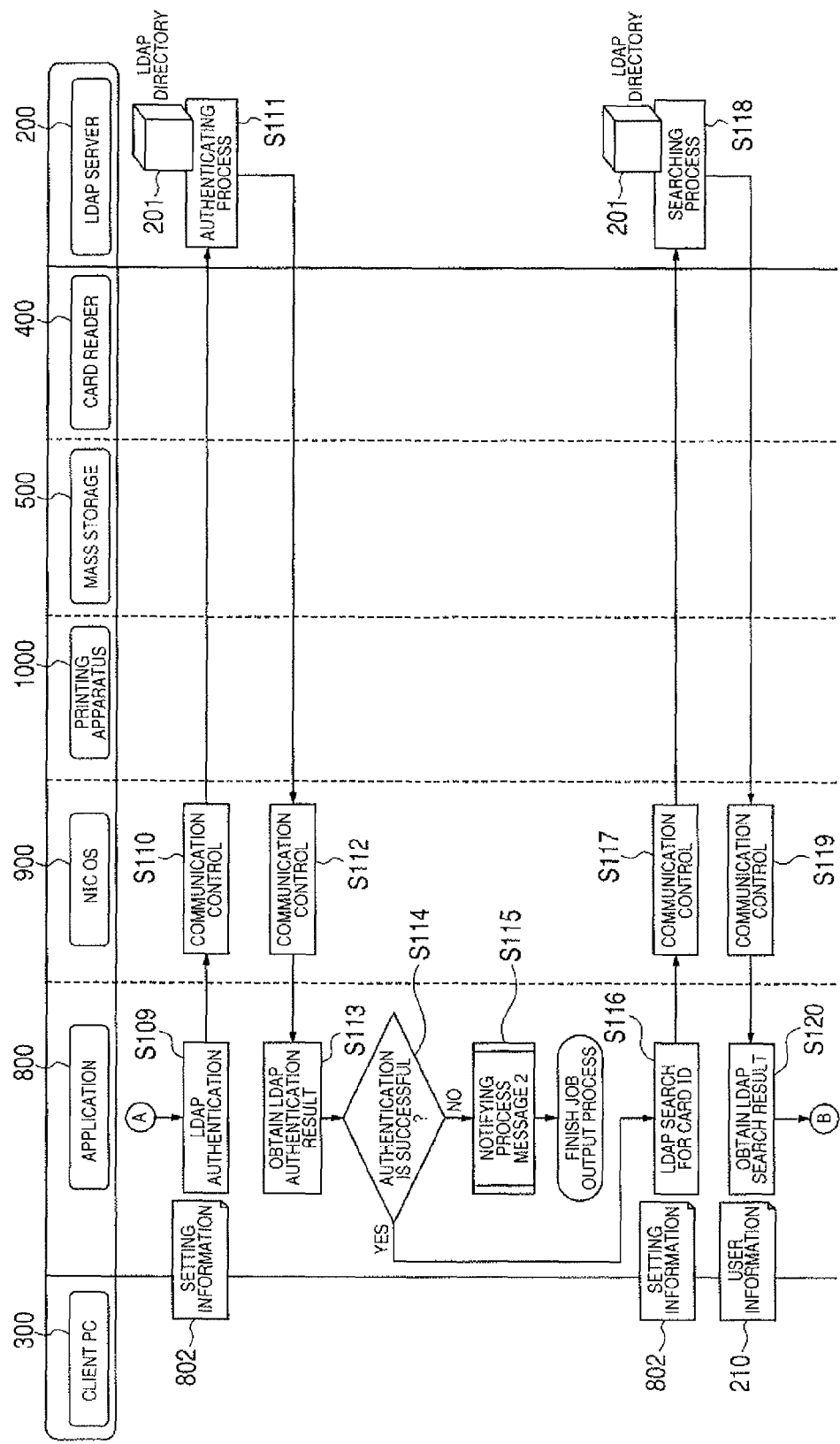
FIG. 10 is a flowchart illustrating an example of the print job output processing procedure of the secure print system 1.
Figure 11:
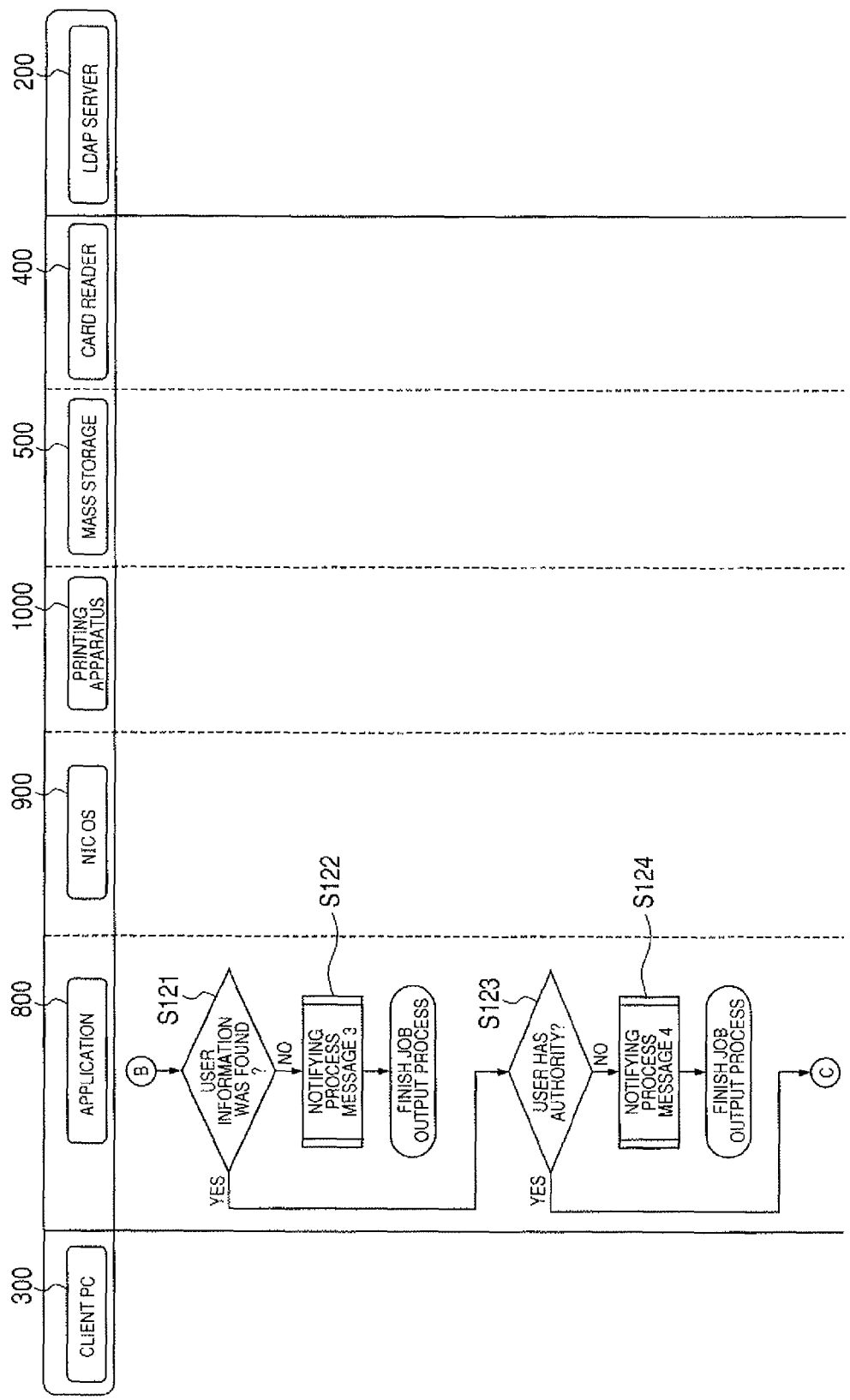
FIG. 11 is a flowchart illustrating an example of the print job output processing procedure of the secure print system 1.
Figure 12:
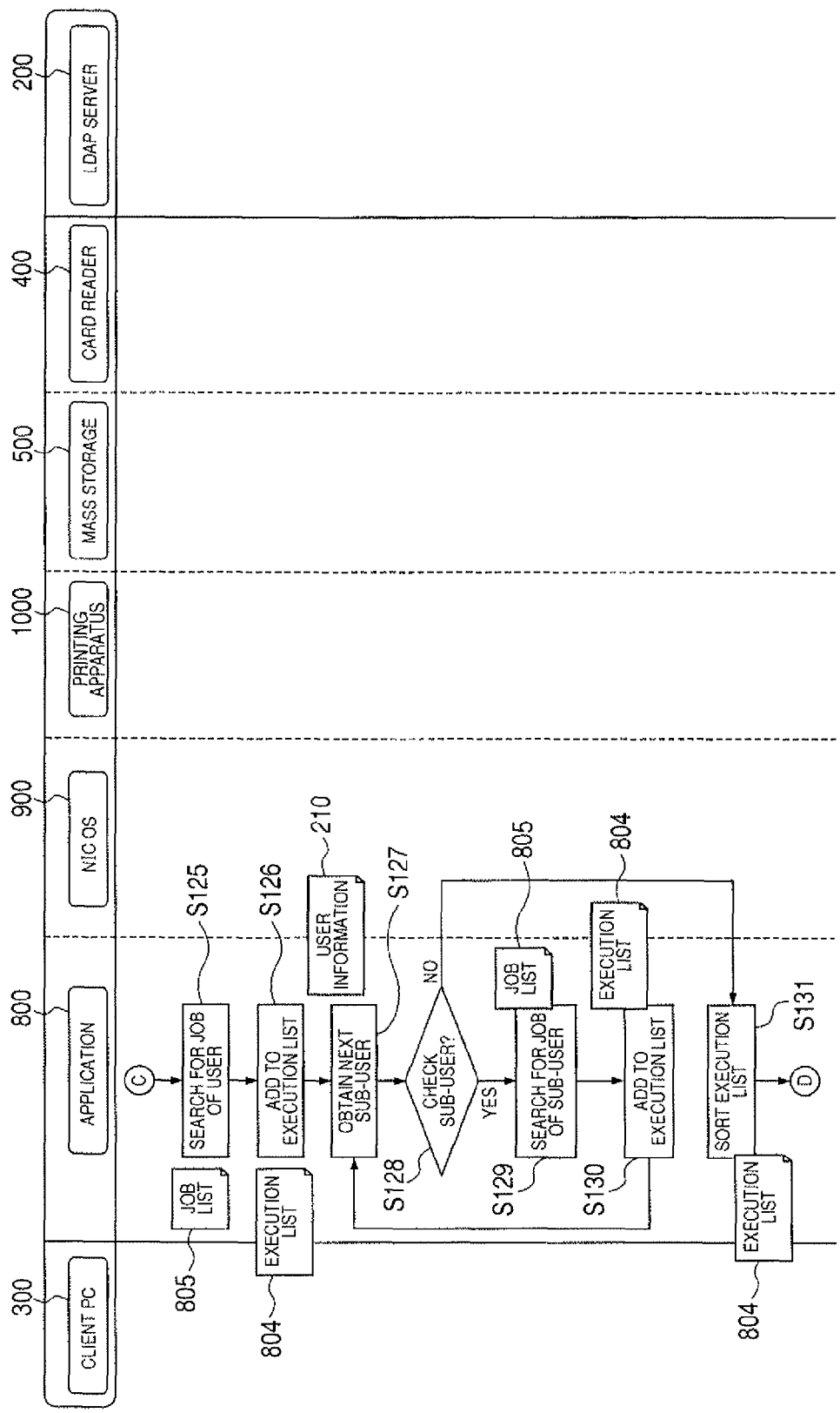
FIG. 12 is a flowchart illustrating an example of the print job output processing procedure of the secure print system 1.
Figure 13:
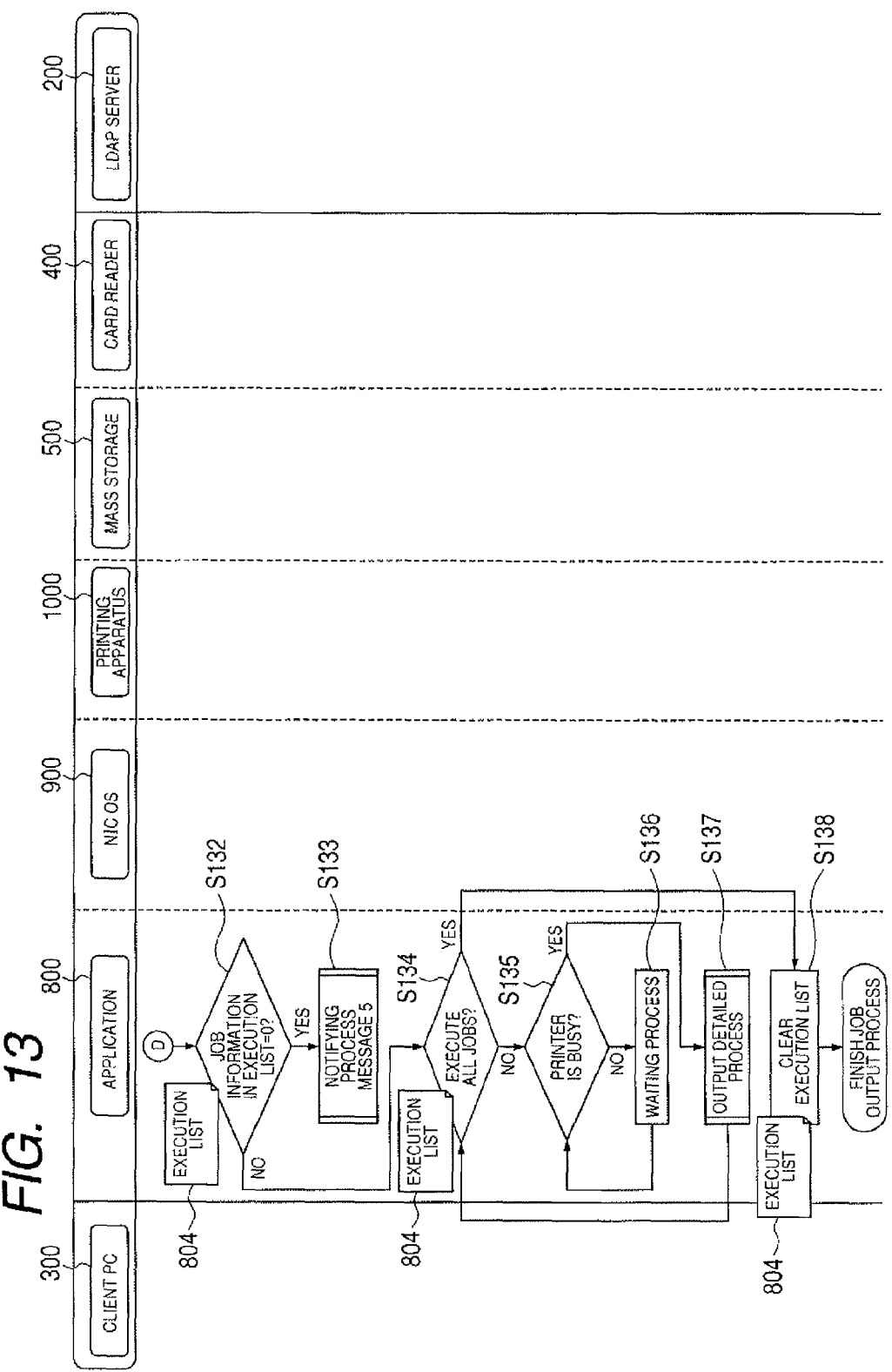
FIG. 13 is a flowchart illustrating an example of the print job output processing procedure of the secure print system 1.
Figure 14:
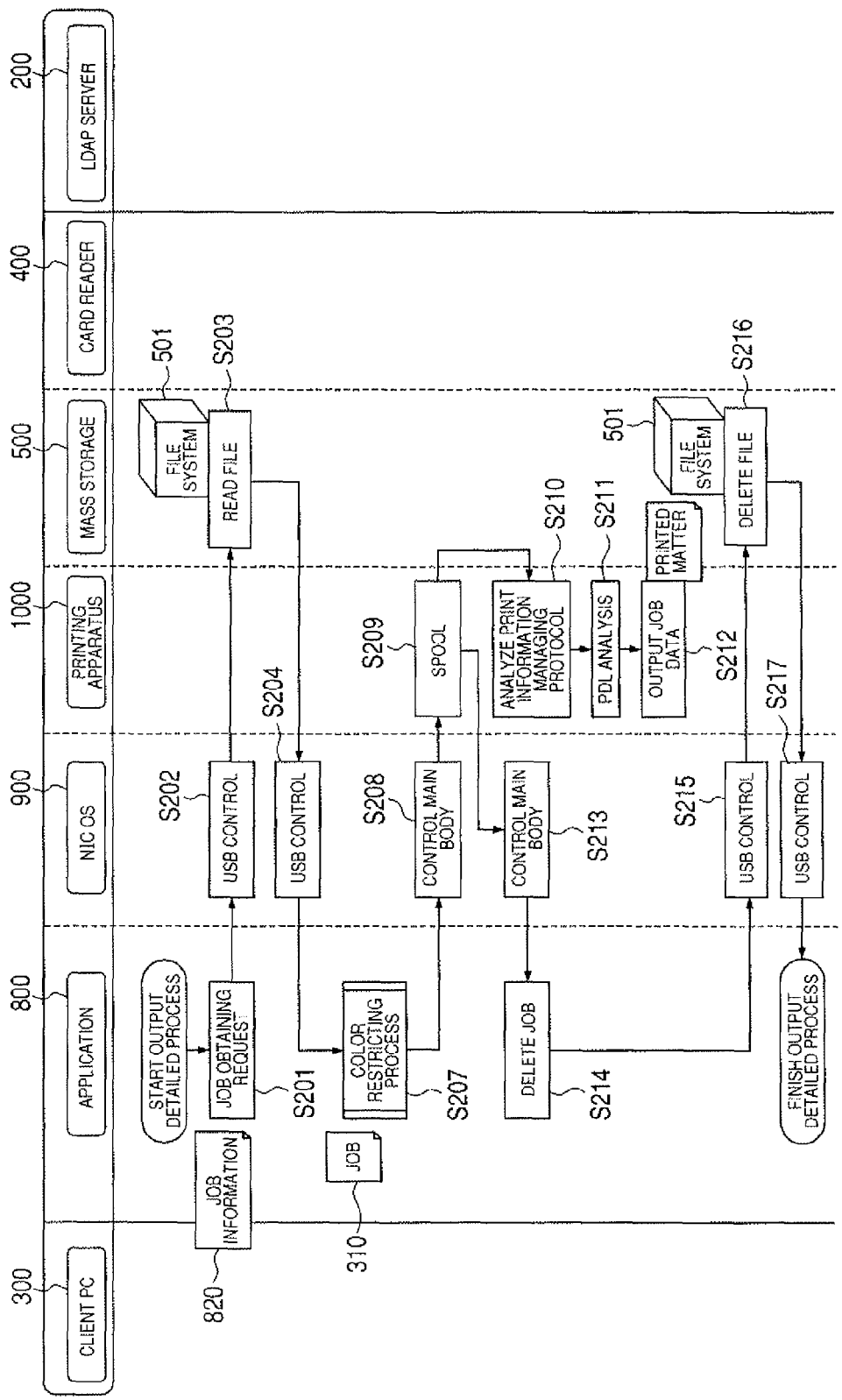
FIG. 14 is a flowchart illustrating an example of a detailed procedure of an outputting process of the secure print system 1.
Figure 15:
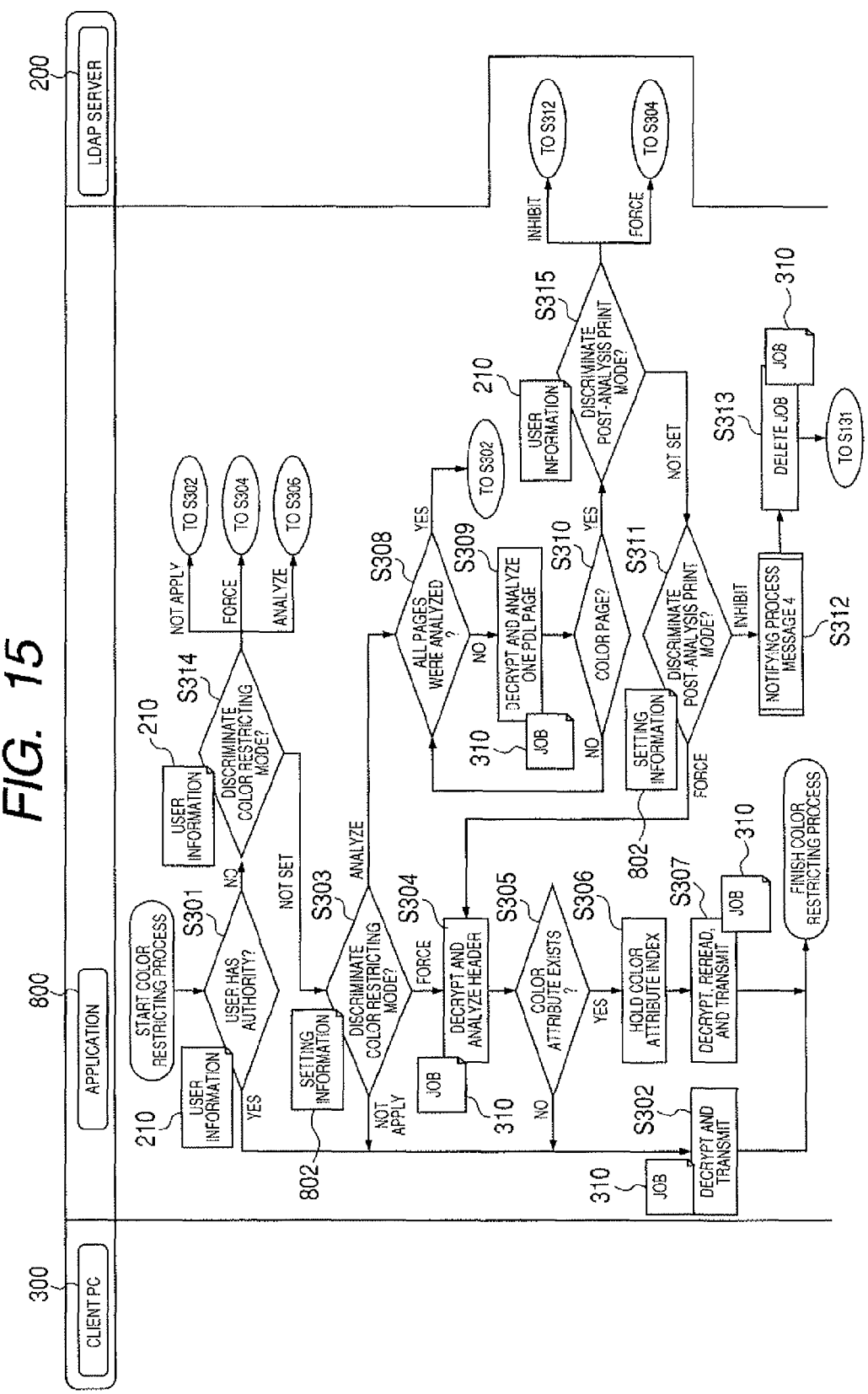
FIG. 15 is a flowchart illustrating an example of a color restriction processing procedure of the secure print system 1.
Figure 16:
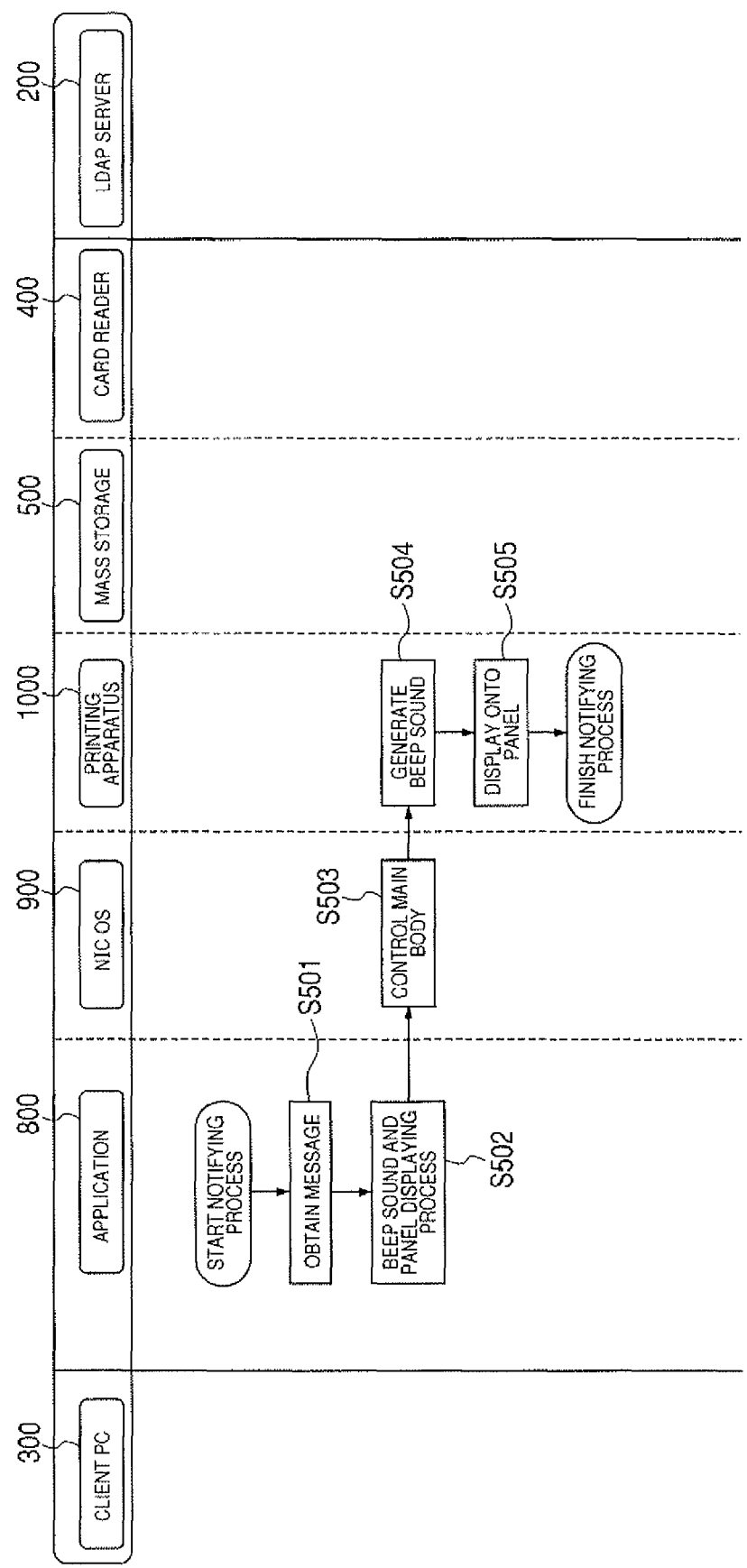
FIG. 16 is a flowchart illustrating an example of a user notification processing procedure of the secure print system 1.

FIG. 8 is a flowchart illustrating an example of a print job input processing procedure of the secure print system 1. FIG. 9 is a flowchart illustrating an example of a print job output processing procedure of the secure print system 1. FIG. 10 is a flowchart illustrating an example of the print job output processing procedure of the secure print system 1. FIG. 11 is a flowchart illustrating an example of the print job output processing procedure of the secure print system 1. FIG. 12 is a flowchart illustrating an example of the print job output processing procedure of the secure print system 1. FIG. 13 is a flowchart illustrating an example of the print job output processing procedure of the secure print system 1. FIG. 14 is a flowchart illustrating an example of a detailed procedure of an outputting process of the secure print system 1. FIG. 15 is a flowchart illustrating an example of a color restriction processing procedure of the secure print system 1. FIG. 16 is a flowchart illustrating an example of a user notification processing procedure of the secure print system 1. FIG. 18 is a diagram illustrating an example of messages which are displayed on the printing apparatus 1000.

The processes which are executed by the NIC 700 will be described hereinbelow while distinguishing the functions of the application 800 from the functions of the NIC OS 900. For this purpose, a main part of the processes is conveniently assumed to be the application 800 and the NIC OS 900. However, actually, the main part of the processes is the NIC 700. The NIC 700 as hardware executes processes, which will be described hereinafter, in cooperation with the application 800 or the NIC OS 900 serving as software.

In FIG. 8, the NIC 700 receives the print data from the client PC 300 (print data receiving unit). The NIC 700 also stores the received print data into the mass storage 500. As illustrated in FIG. 8, in the process for inputting the job into the secure print system 1, the application of the client PC 300 forms the job 310 through the printer driver unit 302 (step S001).

The client PC 300 transmits the formed job 310 to the NIC OS 900 (step S002).

The NIC OS 900 transfers the job 310 to the application 800 (step S009).

The application 800 obtains the job 310 (print data receiving unit), analyzes the print information management header 311 of the job 310, and obtains the job owner and the job name (step S010). The application 800 forms the job information 820 (step S011).

The obtained job owner 312 is stored as a user name 821 and the obtained job name 313 is stored as a job name 823. A character train which is unique in the application is formed and set as a file name 822. The time stamp 824 is stored after the writing into the file was finished.

In order to encrypt the job 310, the application 800 transfers the data of the job 310 to the NIC OS 900 and designates an encrypting key, an encrypting algorithm, and the like (step S012).

The NIC OS 900 encrypts the transferred job data by using the designated parameters (step S013).

The application 800 writes the job encrypted by the NIC OS 900 into the file system 501 (step S014) (print data storage unit).

By writing the job 310 into the file system 501, the operation for writing the job 310 into the printer server 101 as in the related art becomes unnecessary. Thus, the printer server 101 becomes unnecessary and the secure print system having a higher security is realized. Since the printer server 101 is unnecessary, the costs necessary for providing the server and a troublesomeness such as setting to provide the server upon introduction of the secure print system or the like can be omitted. Further, even if the mass storage 500 is removed from the printing apparatus 1000, since the job 310 has been encrypted and written, there is no anxiety in which the PDL data in the job 310 is read out and the higher security is realized.

When the NIC OS 900 transfers the process in which the job 310 has been stored to the mass storage 500 (step S015), the mass storage 500 writes the encrypted job 310 into the file system 501 (step S016).

When the NIC OS 900 transfers the process for writing the encrypted job 310 into the file system 501 to the application 800 (step S017), the application 800 obtains a time stamp at a point of time when the writing of the job 310 into the file system 501 has been finished and stores into the time stamp 824 in the job information 820 (step S018).

The application 800 stores the formed job information 820 into the job list 805 (step S019).

Subsequently, a job output process of the secure print system 1 will be described with reference to FIGS. 9, 10, 11, 12, and 13.

In FIG. 9, the NIC 700 receives the card ID 211 (user identification information). In order to authenticate the card ID 211, the NIC 700 transmits a connecting request to the LDAP server 200 and discriminates whether or not it can communicate with the LDAP server 200. As illustrated in FIG. 9, the card reader 400 detects the IC card 410 and reads the card ID 211 recorded therein (step S100). The NIC OS 900 transfers the read information to the application 800 (step S101) (user identification information receiving unit).

The application 800 tries to connect to the LDAP server 200 based on the setting information 802 (step S104). In more detail, with reference to the setting information 802, the application 800 connects to the primary port of a primary LDAP server 200*a*. If it cannot be connected, the application 800 connects to the secondary port of a secondary LDAP server 200*b*.

The NIC OS 900 tries to connect to the LDAP server 200 based on the connecting request (step S105). The application 800 executes a branching process based on whether or not the trial connection has succeeded (step S106).

In more detail, if the application 800 cannot be connected to both of the primary LDAP server 200*a* and the secondary LDAP server 200*b*, it is regarded that the connection has failed.

The application selects "server error" of a message 2 from messages illustrated in FIG. 18 and executes a user notifying process (step S108).

In FIG. 10, the NIC 700 makes an LDAP authentication. The NIC 700 executes a searching process of the user information 210. As illustrated in FIG. 10, if the application 800 could be connected to either the primary LDAP server 200*a* or the secondary LDAP server 200*b*, the application 800 makes an LDAP authentication (step S109).

The user 837 and the password 838 in the setting information 802 are transmitted to the LDAP server 200 and an authenticating request is issued. The authenticating process is a process in the case where such strong security that if the LDAP server 200 does not authenticate, the searching process is not performed has been made. As another embodiment, if such a setting that the authentication is unnecessary upon searching (setting of non-authentication) has been made, the processes in steps S109 to S114 associated with the authentication may be omitted.

The NIC OS 900 transmits the data sent from the application 800 to the LDAP server 200 (step S110).

The LDAP server 200 searches the LDAP directory 201 by the user name 837 of the data transmitted by the application 800 through the NIC OS 900. If the user was found, the transmitted data is collated with the password 213 included in the user information 210 of the corresponding user and an authentication result is returned (step S111).

When the NIC OS 900 transfers the data received from the LDAP server 200 to the application 800 (step S112), the application 800 receives the LDAP authentication result (step S113).

The application 800 executes the branching process based on the authentication result of step S113 (step S114). If the authentication has failed, the application 800 selects "server error" of the message 2 from the messages illustrated in FIG. 18 and executes the user notifying process (step S115).

When the authentication has succeeded, the application 800 issues a searching instruction of the card ID 211 to the LDAP server 200 based on the setting information 802 (step S116). The application 800 designates a searching position by using the Suffix 831 and the ID code 832 in the setting information 802.

The NIC OS 900 transmits the data sent from the application 800 to the LDAP server 200 (step S117).

The LDAP server 200 searches the LDAP directory 201 based on the data transmitted from the application 800 and returns a search result (step S118). The LDAP server 200 searches for the designated card ID 211 from the data existing under the designated Suffix 831 and ID code 832 and transmits the found user information 210. The Suffix 831 and the ID code 832 are information which is designated in order to specify the position of the user in the LDAP directory 201 and are values which are designated as SearchBase generally at the time of the LDAP search.

When the NIC OS 900 has transmitted the data received from the LDAP server 200 to the application 800 (step S119), the application 800 obtains the search result from the LDAP server 200 (step S120) (print authority information obtaining unit).

In FIG. 11, the NIC 700 confirms the use authority of the user. As illustrated in FIG. 11, the application 800 executes the branching process based on whether or not the user information 210 could be obtained, that is, whether or not the user exists by checking the search result from the LDAP server 200 (step S121). If the user information 210 cannot be obtained, the application 800 selects "user is not registered" of a message 3 from the messages illustrated in FIG. 18 and executes the user notifying process (step S122).

If the user information could be obtained, the application 800 executes the branching process based on whether or not the user has the use authority based on the use restriction 218 in the user information 210 (step S123) (color print discrimination).

Although various setting methods are considered for a use restriction, for example, the use authority is expressed by numerals of four digits. It is assumed that the first digit indicates the use authority of a printer, the second digit indicates the use authority of a copy, the third digit indicates the use authority of a scan, and the fourth digit indicates the use authority of a facsimile. As for a value of each digit, it is assumed that "0" indicates "cannot be used", "1" indicates "only monochromatic printer can be used", and "2" indicates "both of color printer and monochromatic printer can be used". There is considered a method whereby with reference to the use authority in the user information 210, when an item of the printer is equal to "0", it is regarded as "there is no authority" and when it is equal to "1" or "2", it is regarded as "there is authority".

If the user does not have the use authority, the application 800 selects "server error" of a message 4 from the messages illustrated in FIG. 18 and executes the user notifying process (step S214).

In FIG. 12, the NIC 700 obtains the job 310 corresponding to the user information 210 from the job list 805 and adds to the execution list 804. As illustrated in FIG. 12, if the user has the use authority, the application 800 extracts the job information 820 in which the user name coincides from the job list 805 by using the user name 212 in the obtained user information 210 as a key (step S125).

The application 800 forms the execution list 804 by using the extracted job information 820 as a list (step S126).

The application 800 obtains the sub-user from the obtained user information 210 (step S127).

If the sub-user 1 has already been obtained just before, the application 800 obtains the next sub-user 2. A series of processes in steps S127 to S130 regarding the sub-users is processes for allowing one user to output printed matters for a plurality of users. For example, since up to one user can be registered per IC card in the related art, if a secretary wants to output the printed matter for his boss, it is necessary to borrow the IC card. The single user who uses two personal computers needs to carry two IC cards. By executing the series of processes regarding the sub-users, the foregoing problem can be solved and the printed matters for a plurality of users can be output by using one IC card.

The application 800 checks the obtained sub-user (step S128). If all of the sub-users 1 to 4 were obtained, if the sub-users cannot be obtained, or if the sub-users are not registered, the processing routine advances to step S131.

If the sub-user could be obtained, the application 800 extracts the job information 820 which coincides with the sub-user from the job list 805 (step S129) and adds the extracted job information 820 to the execution list 804 (step S130).

If all of the sub-users were obtained, the application 800 sorts the formed execution list 804 (step S131).

The application 800 sorts the job information 820 based on the time stamp 824, subsequently, sorts them based on the user name 821, and time-sequentially rearranges them by a bundle of the user names 821. Owing to the sorting, when the operator wants to output the printed matters for a plurality of users, a bundle of output matters is obtained every user, and a sorting effort can be omitted. Since the printed matters of the respective users have been arranged in order of the time stamps, the printed matters are arranged in order as instructed by the user who executed the printing, so that they are output in order which can be easily understood by the user. A sorting method is not limited to the above method but the job information may be sorted based on the user name and may be subsequently sorted based on the time stamp.

In FIG. 13, the NIC 700 inputs the job on the execution list 804. As illustrated in FIG. 13, the application 800 checks the number of job information 820 in the execution list 804 (step S132). If it is equal to 0, the application 800 selects "there is no job" of a message 5 from the messages illustrated in FIG. 18 and executes the user notifying process (step S133).

If the number of job information 820 in the execution list 804 is equal to 1 or more, the application 800 executes a loop process by the number of job information 820 in the execution list 804 (step S134). After all of the job information 820 was referred to, the loop process is finished. The loop process is a process for executing steps S135 to S137 with respect to all of the job information 820 in the execution list. In step S134, whether or not the process has been finished is discriminated with respect to all of the job information 820 in the execution list 804. If it is determined that the process has been finished, the processing routine advances to step S138.

The application 800 discriminates whether the job input is permitted or inhibited (step S135). Ordinarily, since the printing apparatus has a restriction in a memory capacity in the RAM, the number of print jobs which can be input in a lump is limited. The reason why the permission or inhibition of the job input is discriminated is to prevent such a situation that the job is input in spite of a fact that the number of jobs which can be input has exceeded the limited number, so that the printing fails.

Subsequently, the application 800 executes a waiting process (step S136). The waiting process prevents such a phenomenon that in the case where the job cannot be input since the number of jobs exceeds the limited number, the processing routine continuously circulates the processing loop (steps S135 to S137) and occupies the CPU.

The application 800 executes an output detailed process (step S137) illustrated in FIG. 14 and clears all of the job information 820 in the execution list 804 (step S138).

Subsequently, a job output process of the secure print system 1 will be described with reference to FIG. 14.

In FIG. 14, the NIC 700 transmits the print data to the printing apparatus 1000. As illustrated in FIG. 14, the application 800 obtains the job 310 from the file system 501 based on the job information 820 sent from an upper apparatus (step S201). The application 800 requests the mass storage 500 to obtain the file in the file system 501 which coincides with the file name 822 stored in the job information 820.

When the NIC OS 900 transfers the instruction from the application 800 to the mass storage 500 (step S202), the mass storage 500 reads the designated file from the file system 501 and returns to the application 800 (step S203). The NIC OS 900 transfers the instruction from the mass storage 500 to the application 800 (step S204).

The application 800 executes a color restricting process illustrated in FIG. 15 (step S207). That is, in the embodiment, by reading the card ID 211 in step S100, the print job is read out of (obtained from) the file system 501 and the color restricting process including a color analyzing process is started. The NIC OS 900 receives the instruction from the application 800 and transfers the print instruction of the job 310 to the printing apparatus 1000 by using print information managing protocol communication (step S208).

The printing apparatus 1000 receives the job 310, stores into the reception buffer, and executes a spooling process (step S209). After completion of the storage into the reception buffer, the printing apparatus 1000 returns the control to the NIC OS 900 without waiting for the end of the printing.

The printing apparatus 1000 analyzes the print information management header 311 of the data of the spooled job 310 (step S210). The analyzed data is used for internal log data or the like (not shown).

The printing apparatus 1000 analyzes the PDL data in the job 310, forms intermediate data of a drawing object, forms a bitmap image based on the intermediate data (step S211), and prints the formed bitmap image onto a media such as paper or the like by a well-known printing technique (step S212).

When the NIC OS 900 transfers the instruction from the printing apparatus 1000 to the application 800 (step S213), the application 800 transmits an instruction for deleting the relevant job 310 from the file system 501 to the mass storage 500 (step S214).

When the NIC OS 900 transfers the instruction from the application 800 to the mass storage 500 (step S215), the mass storage 500 deletes the designated job 310 from the file system 501 (step S216).

The NIC OS 900 transfers the instruction from the mass storage 500 to the application 800 (step S217).

Subsequently, the color restricting process of the secure print system 1 will be described with reference to FIG. 15.

In FIG. 15, the NIC 700 changes the color mode 314 (color/monochrome setting information) of the print information management header 311 as necessary based on the use restriction 218 included in the user information 210, information (color mode declaration, color mode change) of a color type of the job 310, the color restricting mode 219 and the post-analysis print mode 220 included in the user information 210, the color restricting mode 839 and the post-analysis print mode 840 set in the setting information 802, and the like, and transmits the changed color mode 314 to the printing apparatus 1000. In detail, the NIC 700 discriminates whether or not the user can perform the color printing based on the use restriction 218. If the execution of the color printing by the user is restricted, the NIC 700 analyzes the job 310 (analyzing mode) or forcedly changes the color mode 314 (color/monochrome setting information) to the monochromatic mode (forcing mode). When the NIC 700 has analyzed the job 310, if the job 310 includes a page of the color printing, the NIC 700 changes the color mode 314 (color/monochrome setting information) to the monochromatic mode. If the job 310 does not include the page of the color printing, the NIC 700 does not change the color mode 314 (color/monochrome setting information). In order to allow the printing apparatus 1000 to print, the NIC 700 transmits the job 310 to the printing apparatus 1000.

The application 800 confirms the use restriction 218 in the user information 210 obtained in step S120 (step S301). Specifically speaking, the use restriction 218 is checked by a method similar to that in step S123. If the user has the use authority in which he can print the color job, in order to execute the ordinary printing, the processing routine advances to step S302. If the user does not have the authority in which he can print the color job, the processing routine advances to step S314. The reason why the presence or absence of the authority of the user is preliminarily discriminated is to avoid such a situation that in spite of a fact that the user has the authority in which he can print the color job, by purposely forcedly changing the job to the monochromatic mode or analyzing the job, the performance is deteriorated.

In step S302, the application 800 transfers the job 310 to the NIC OS 900. At this time, the NIC OS 900 transmits the job 310 to the NIC OS 900 on a predetermined block unit basis while decrypting the job 310 (print data transmitting unit). If all of the job data has been decrypted in a lump, when a job size is large, the memory is loaded down and there is a case where an influence is exerted on other processes. The reason why the job is transmitted on a predetermined block unit basis while being decrypted is to avoid such a problem.

In step S314, the application 800 refers to the color restricting mode 219 in the user information 210. In the color restricting mode 219, four kinds of modes of "force/analyze/not apply/not set" can be set. Meanings of those modes are as follows. In the case of "force", when the user does not have the authority in which he can print the color job, the job is forcedly converted into the monochromatic mode. In the case of "analyze", when the user does not have the authority in which he can print the color job, the job is analyzed and if it is a color job, the forced monochromatic printing is executed or the printing is inhibited. Whether the forced monochromatic printing is executed or the printing is inhibited is decided according to the setting (force/inhibit) of the post-analysis print mode 840 in the setting information 802. In the case of "not apply", even if the user does not have the authority in which he can print the color job, the color job is printed as it is. In the case of "not set", the processing method is not discriminated from the color restricting mode 219 in the user information 210. As will be described hereinafter, if "not set" has been set here, the processing method is discriminated from the color restricting mode 839 in the setting information 802.

Features of the processes when the color restricting mode 219 is "force" and when it is "analyze" will be described here.

In the case of "force", it is necessary to rewrite a header of the job. In this case, although the job itself is the color mode, it is converted into the monochromatic mode by the function of the printing apparatus 1000. In the case of the ordinary monochromatic job, that is, when the monochromatic job has been formed by the printer driver unit 302, the printed matter becomes a monochromatic printed matter by the function of the printer driver unit 302. Since the main parts of forming the monochromatic job differ in both of the above jobs, picture quality of the job which is output changes.

In the case of "analyze", there is such a problem that the performance deteriorates extremely. This is because upon discrimination about the color job, since it is necessary to analyze the PDL data 315 and the data up to the last job is consequently confirmed, if the job size increases, it takes a very long time for analysis.

As mentioned above, in the case of "force", although a processing speed is higher than that in the case of "analyze" for analyzing the job, the quality of the printed matter changes. In the case of "analyze", although the processing speed is low, the output of the user who does not have the authority can be perfectly inhibited. There are merits and demerits in both cases as mentioned above and there is a possibility that which function is used by the user who intends to introduce the system differs. In order to realize a more flexible system by satisfying requirements of both of them, the discriminating step S314 and a discriminating step S303, which will be described hereinafter, are executed.

The color restricting mode 219 which is set in the user information 210 and the color restricting mode 839 which is set in the setting information 802 are setting items having the same meaning. By allowing the settings of the same meaning to be included in the user information 210 and the setting information 802, the process can be changed every user, or the processing method can be uniformly set by the application 800, and the more flexible color restriction can be performed.

As a result of the discrimination of step S314, if the color restricting mode 219 which is set in the user information 210 has been set to "not apply", step S302 follows. If it has been set to "force", step S304 follows. If it has been set to "analyze", step S308 follows. If it has been set to "not set", step S303 follows.

In step S303, the application 800 refers to the color restricting mode 839 (setting about whether the color analysis is performed or the color job is forcedly changed to the monochromatic job) in the setting information 802 which has been preset every user (discriminating unit). Three kinds of setting items of "force/analyze/not apply" can be set into the color restricting mode 839. The meaning of each setting is as mentioned above.

As a discrimination result of step S303, if the color restricting mode 839 in the setting information 802 has been set to "force", step S304 follows. If it has been set to "analyze", step S308 follows. If it has been set to "not apply", step S302 follows.

In step S304, the application 800 analyzes the print information management header 311 while decrypting the job 310. Specifically speaking, information showing at which number of designated byte in the data of the job 310 the color mode 314 in the print information management header 311 exists is obtained (index obtaining unit).

In step S305, the application 800 discriminates whether or not the color mode 314 has been found in the print information management header 311 of the job 310 as an analysis result of step S304. The print information management header 311 differs depending on the printer driver as a forming main part. For example, when the monochromatic printer driver is used, since it is obvious that the formed job is a monochromatic job, there is a case where the color mode 314 is not set into the print information management header 311. In such a case, the discrimination of step S305 is performed in order to execute the ordinary printing by regarding as a monochromatic job. If the color mode 314 is not found as a discrimination result, step S302 follows. If the color mode 314 has been found, step S306 follows.

In step S306, the application 800 holds a binary index (position) where the color mode 314 obtained in step S305 at the front stage exists.

In step S307, the application 800 transfers the data of the job 310 to the NIC OS 900 (print data transmitting unit).

The application 800 transmits a print command including the information for the job decryption, the identification information of the job 310, and the held index. The NIC OS 900 obtains the job 310 from the mass storage 500 according to the ID information. The NIC OS 900 does not obtain all of the data of the job 310 in a lump but obtains the data by dividing them every block. At this time, since the job 310 has been encrypted, the obtained data of the block is decrypted based on the decryption information sent together with the print command. The NIC OS 900 transmits the decrypted data to the printing apparatus 1000 (print data transmitting unit). The process of each block is continued until the processes of all of the data of the job 310 are finished. There is such an effect that by processing every block, a use amount of the memory is suppressed. There is such an advantage that even when a data size of the job 310 is large, the output of the print data can be started without waiting for completion of all of the processes.

In order to efficiently realize the forced monochromatic function, a rereading process of the data in the color mode is executed during the series of transmitting processes mentioned above. Specifically speaking, the process is executed as follows. First, after the data of the block was decrypted, the number of bytes of the decrypted data is counted. Just before the block is transmitted, the counted accumulated number of bytes is compared with the index sent together with the print command. When the accumulated number of bytes exceeds the index, this means that the value of the color mode is included in the block. At this time, the data (=color mode 314) existing in the index is reread as a value of "monochromatic" and the transmitting process of the block is executed.

Ordinarily, in order to forcedly convert the print job into the monochromatic job, it is sufficient to rewrite the color mode 314 of the print information management header 311. However, if the job 310 has been encrypted, even in the case of merely rewriting the print information management header 311, it is necessary to rewrite the whole file. This is because in terms of an encryption mechanism, even if a part of the data was changed, the whole data is eventually partially different from the data before the change. However, by executing the series of processes of steps S304 to S307, the data in which the print information management header 311 has been reread can be transmitted without rewriting the whole file, so that the deterioration in performance can be avoided.

In step S308, the application 800 discriminates whether or not the analysis of the job 310 has been finished. The discrimination about the end of the analysis is made based on a reference about whether or not the analysis of all of the pages of the PDL data of the job 310 has been finished. As a result of the discrimination, if there is a page which is not yet analyzed, step S309 follows. If the analysis of all of the pages has been finished, step S302 follows. During the analysis of the page, if the page is a color page, the analysis is finished. Therefore, the determination that the analysis of all of the pages has been finished is synonymous with a case where all of the pages are monochromatic pages. Therefore, the processing routine advances to step S302 for executing the ordinary printing.

In step S309, the application 800 analyzes the page of the PDL data 315 while decrypting the job 310 (print data analyzing unit). In the page analysis in this step, whether or not the attribute of the color mode declaration or the color mode change exists at the head of the page is analyzed and if those attributes exist, whether or not the value indicates the color or the monochrome is analyzed.

In step S310, the application 800 discriminates whether or not an analysis result in step S309 indicates the color (whether or not the color data is included). If the color mode declaration or the color mode change does not exist or if those attributes exist and the value indicates the monochrome, the page is regarded as a monochromatic page and the processing routine advances to step S308 and the next page is analyzed. If those attribute exist and the value indicates the color, the job is regarded as a color job, the analysis is interrupted on the way, and the processing routine advances to step S315. If at least one page is color (color data), since the job can be regarded as a color job, the analysis is stopped here without analyzing up to the last page in order to allow the PDL data analysis which takes a time to be executed as soon as possible.

In step S315, the application 800 discriminates the post-analysis print mode 220 in the user information 210. Three kinds of setting items of "force/inhibit/not set" can be set into the post-analysis print mode 220. The meaning of each setting item is as follows. The item "force" means that if the job is determined to be a color job as an analysis result, the job is forcedly converted into the monochromatic job and output. The item "inhibit" means that if the job is determined to be a color job as an analysis result, the output of the job is inhibited. The item "not set" means that the processing method is not discriminated from the post-analysis print mode 220 in the user information 210.

The post-analysis print mode 220 which is set into the user information 210 and the post-analysis print mode 840 which is set into the setting information 802 of the application 800 have the same contents. By allowing the settings of the same contents to be included in the user information 210 and the setting information 802, the process can be changed every user, or the processing method can be uniformly set by the application 800, and the more flexible color restriction can be performed.

As a result of the discrimination of step S315, if the post-analysis print mode 220 set in the user information 210 has been set to "inhibit", step S312 follows. If it has been set to "force", step S304 follows. If it has been set to "not set", step S311 follows.

In step S311, the application 800 discriminates the post-analysis print mode 840 in the setting information 802. Two kinds of setting items of "force/inhibit" can be set into the post-analysis print mode 840. As a result of the discrimination of step S311, if the post-analysis print mode 840 has been set to "force", step S304 follows. If it has been set to "inhibit", step S312 follows.

In step S312, the application 800 selects "user error" of the message 4 from the messages illustrated in FIG. 18 and executes the user notifying process. After that, step S313 follows.

In step S313, the application 800 deletes the job 310 which has been determined as "inhibit" in step S311 at the front stage. After that, in order to execute the next job in the execution list 804, the processing routine is returned to step S131. The reason why the job 310 is deleted is to prevent such a situation that each time the user puts the card over the card reader, an error message of the job having no authority is displayed and the user feels a troublesomeness and thereby to improve usability.

Subsequently, the user notifying process of the secure print system 1 will be described with reference to FIG. 16. In FIG. 16, the NIC 700 notifies the user of the designated message.

As illustrated in FIG. 16, the application 800 obtains a message character train sent from the upper apparatus (step S501) and requests the NIC OS 900 to generate the beep sound and display a designated message (step S502).

The NIC OS 900 discriminates the type of printing apparatus 1000 and instructs the generation of the beep sound by using a proper method (step S503). For example, since any one of the UDP, print information managing protocol, and JL is used according to the apparatus type, the NIC OS 900 absorbs the information showing the method and instructs the generation of the beep sound by using the method according to the type of printing apparatus 1000. With respect to the panel display, a display instruction is sent to the printing apparatus 1000 by using the MIB.

The printing apparatus 1000 receives the instructions, allows the beep sound to be generated (step S504), and allows the designated message to be displayed onto the panel (step S505).

As mentioned above, according to the embodiment of the invention, such a mechanism that can avoid the deterioration in picture quality that is caused when the color printing is restricted according to the authority and the monochromatic printing is forcedly executed can be provided. Such a mechanism that the color printing is restricted according to the authority without deteriorating the performance can be also provided.

Embodiment 2

Subsequently, an embodiment 2 of the secure print system 1 according to the invention will be described.

In the embodiment 1, in the case of forcedly performing the monochromatic printing or inhibiting the color printing according to the authority of the user, as illustrated at 6-1 in FIG. 6, after the user put the card over the card reader, the job is analyzed and the color printing is restricted.

However, in the secure print system in which the print data is accumulated and by putting the card over the card reader, the accumulated print data is output, it takes a time until the print data is printed by the printing apparatus 1000 after the printing was instructed by the client PC 300 and it also takes a time until the user moves to the printing apparatus 1000.

In the embodiment 2, therefore, the time which is required until the card is put over the card reader after print instruction was issued is allocated to the analyzing process of the job, thereby enabling the print processing time to be reduced.

In the embodiment 2, although the mechanism for restricting the color printing in a manner similar to that in the embodiment 1 is provided, the job is analyzed when the user inserts the printed matter. It corresponds to the timing after 2-1 illustrated in FIG. 6.

In the embodiment 2, although the mechanism for restricting the color printing according to the authority in a manner similar to that in the embodiment 1 is provided as mentioned above, the processing performance in the embodiment 1 is further improved.

Subsequently, the embodiment 2 will be described with reference to FIGS. 28 to 34.

Figure 28:
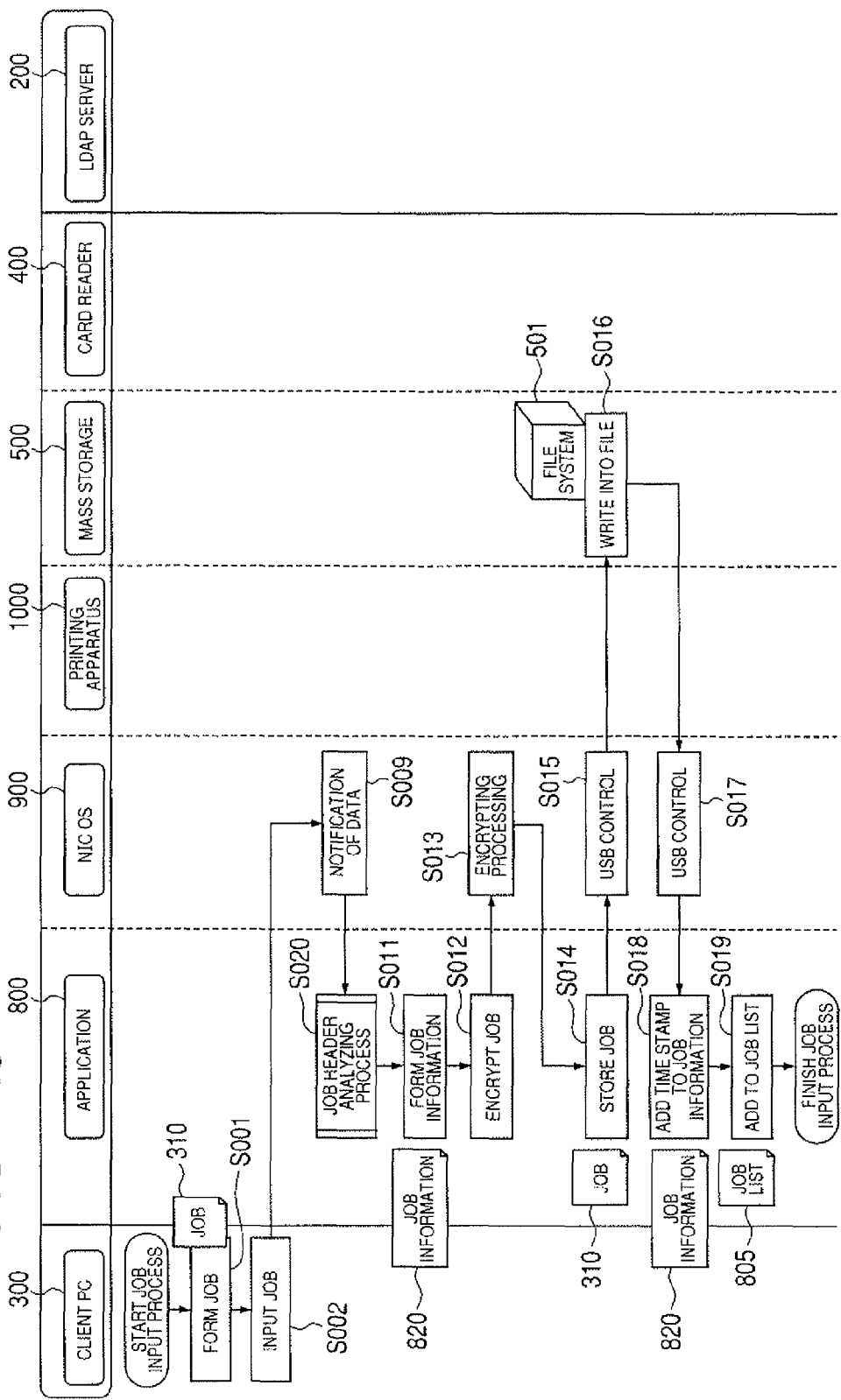
FIG. 28 is a flowchart illustrating an example of a print job input processing procedure in an embodiment 2 of the secure print system 1.
Figure 29:
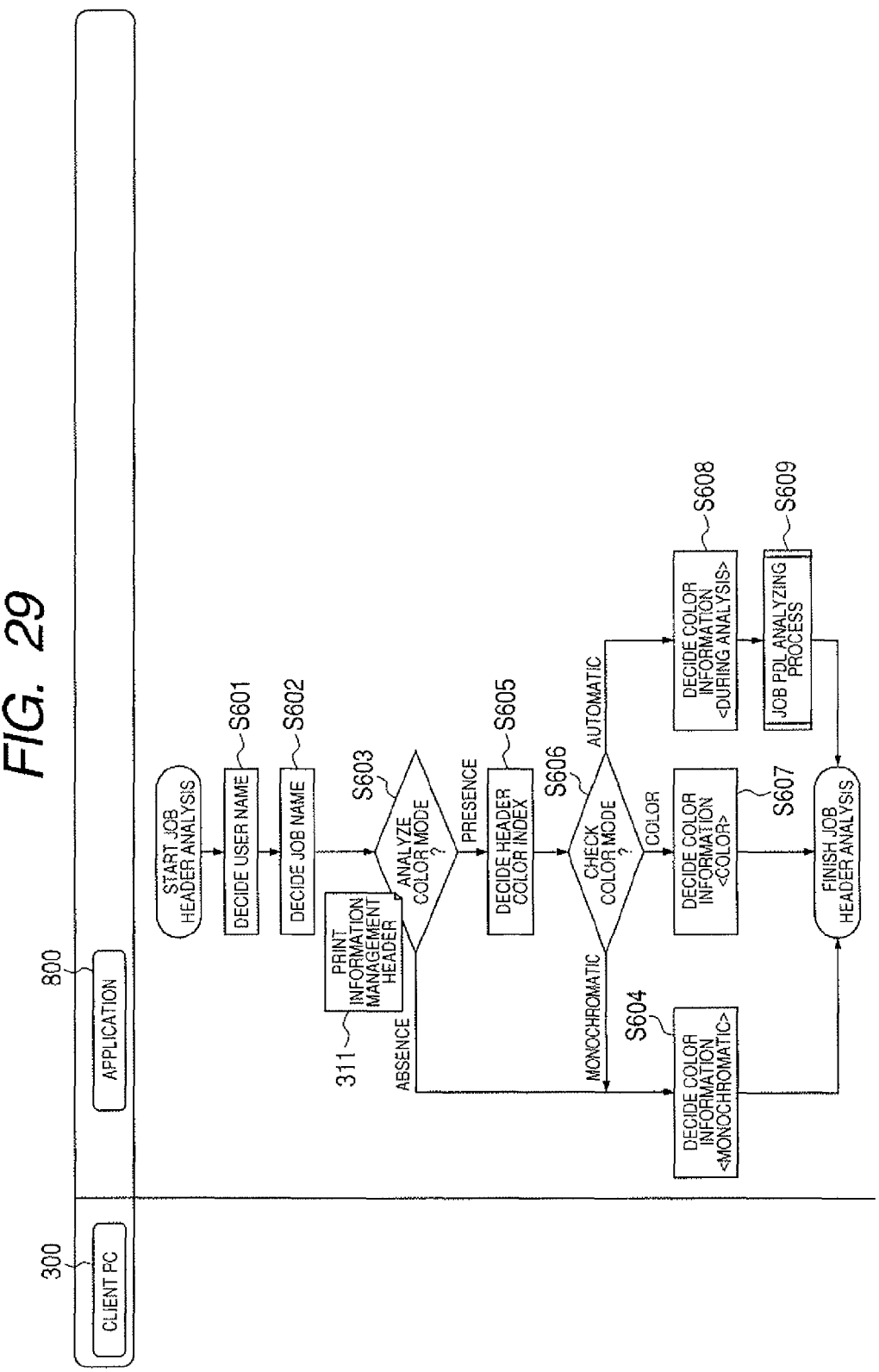
FIG. 29 is a flowchart illustrating an example of a job header analysis processing procedure in the embodiment 2 of the secure print system 1.
Figure 30:
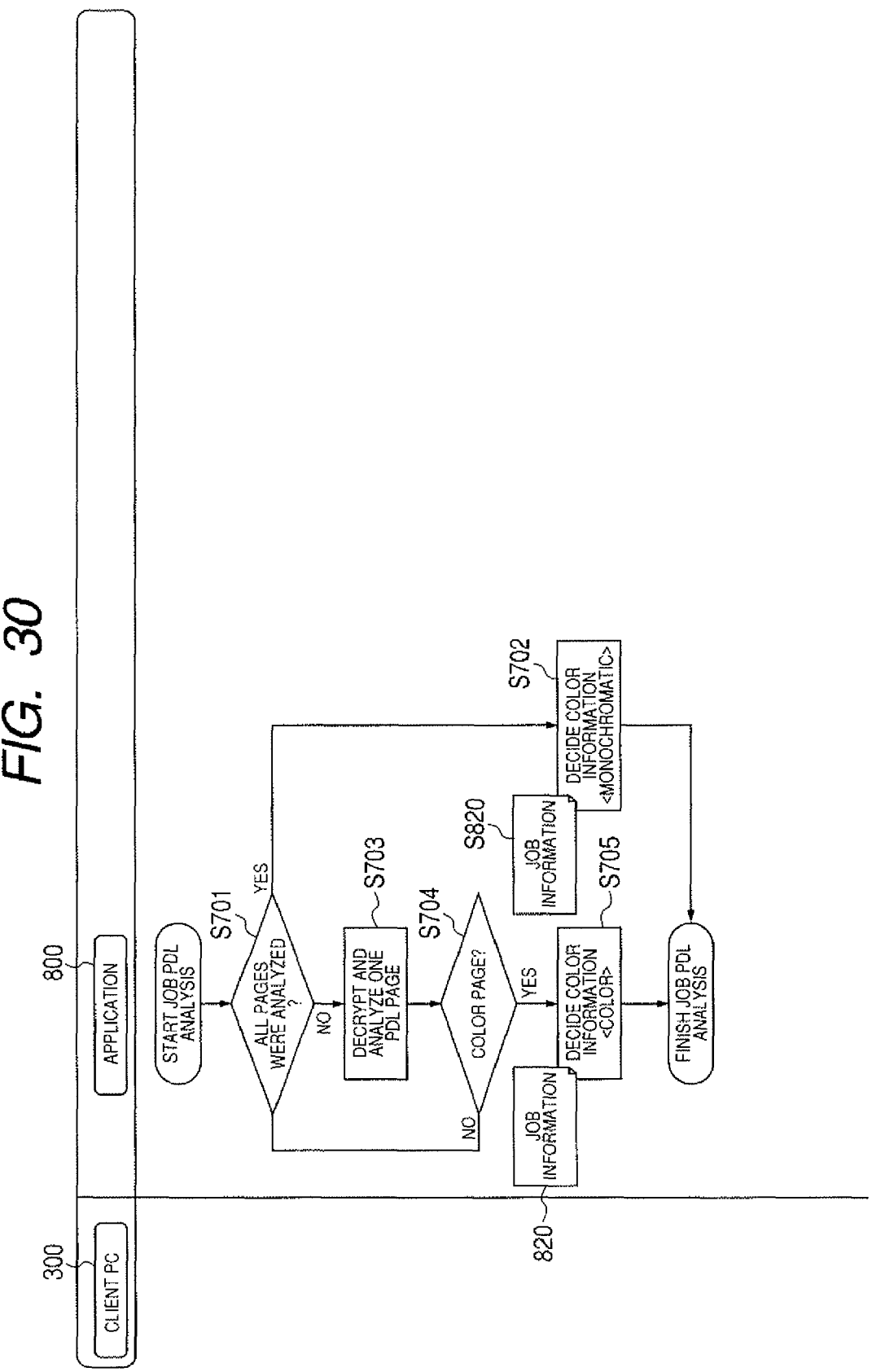
FIG. 30 is a flowchart illustrating an example of a job PDL analysis processing procedure in the embodiment 2 of the secure print system 1.
Figure 31:
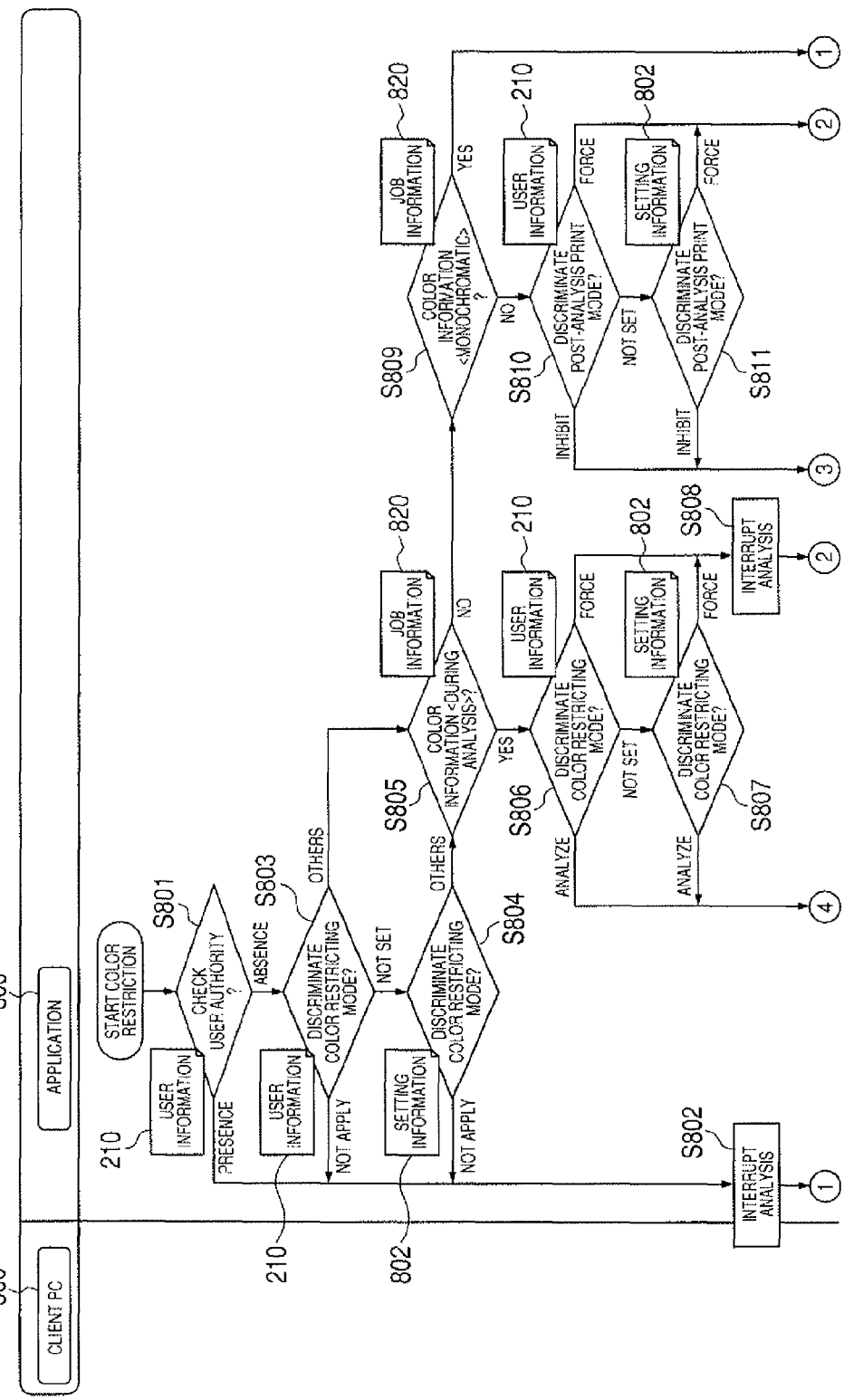
FIG. 31 is a flowchart illustrating an example of a color restriction processing procedure in the embodiment 2 of the secure print system 1.
Figure 32:
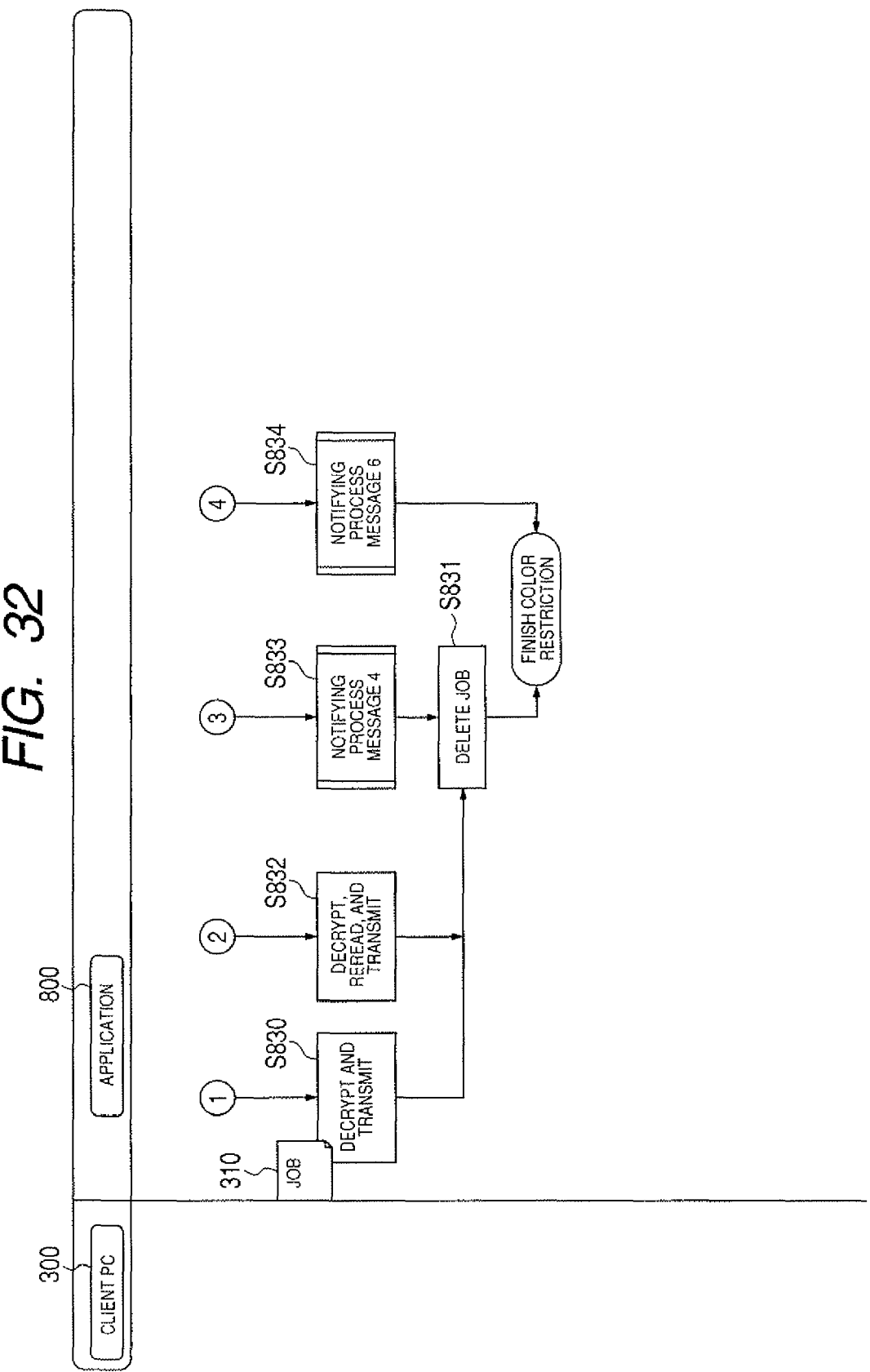
FIG. 32 is a flowchart illustrating an example of the color restriction processing procedure in the embodiment 2 of the secure print system 1.
Figures 33, 34:
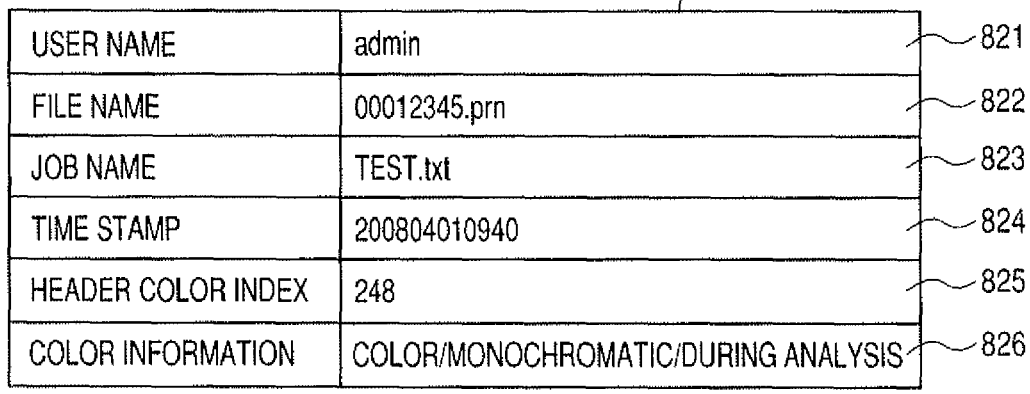
FIG. 33 is a diagram illustrating an example of messages which are displayed on the printing apparatus 1000 in the embodiment 2.
FIG. 34 is a diagram illustrating details of the job information 820 in the embodiment 2.

The embodiment 2 can be realized by replacing FIG. 8 in the embodiment 1 by FIGS. 28, 29, and 30, replacing FIG. 15 in the embodiment 1 by FIGS. 31 and 32, replacing FIG. 18 in the embodiment 1 by FIG. 33, and replacing FIG. 21 in the embodiment 1 by FIG. 34.

The other drawings are similarly used in the embodiments 1 and 2 and their overlapped description is omitted here. Although the embodiment 2 and the foregoing embodiment 1 will be described as different embodiments, according to the embodiment, by switching the setting of the printing apparatus 1000, whether the processes of the embodiment 1 are executed or the processes of the embodiment 2 are executed is discriminated and the embodiment to be subjected to the processes is decided. For example, the setting for making such a switching has been stored in the setting information 802. If the setting which is analyzed after the card was put over the card reader has been stored in the setting information 802, the processes of the embodiment 1 are executed. If the setting which is analyzed immediately after the print job was input to the printing apparatus 1000 (the print job was received) has been stored in the setting information 802, the processes of the embodiment 2 are executed.

Data which is used in the embodiment 2 will be described with reference to FIG. 34.

FIG. 34 is a diagram illustrating details of the job information 820 in the embodiment 2 of the secure print system 1.

The job information 820 is information obtained by extracting the information necessary to manage the job 310 and has the user name 821, the file name 822, the job name 823, the time stamp 824, a header color index 825, color information 826, and the like.

The job information 820 illustrated in FIG. 34 is similar to the job information 820 illustrated in FIG. 21 and is obtained by adding the header color index 825 and the color information 826 to the job information 820 illustrated in FIG. 21.

Subsequently, the detailed processes of the embodiment 2 will be described with reference to FIGS. 28, 29, 30, 31, 32, and 33.

FIG. 28 is a flowchart illustrating an example of a print job input processing procedure in the embodiment 2 of the secure print system 1. FIG. 29 is a flowchart illustrating an example of a job header analysis processing procedure in the embodiment 2 of the secure print system 1. FIG. 30 is a flowchart illustrating an example of a job PDL analysis processing procedure in the embodiment 2 of the secure print system 1. FIG. 31 is a flowchart illustrating an example of a color restriction processing procedure in the embodiment 2 of the secure print system 1. FIG. 32 is a flowchart illustrating an example of the color restriction processing procedure in the embodiment 2 of the secure print system 1. FIG. 33 is a diagram illustrating an example of messages which are displayed on the printing apparatus 1000 in the embodiment 2 of the secure print system 1.

With respect to the processes which are executed by the NIC 700, the functions of the application 800 and the functions of the NIC OS 900 will be separately described. For this purpose, a main part of the processes is conveniently assumed to be the application 800 and the NIC OS 900. However, actually, the main part of the processes is the NIC 700. The NIC 700 as hardware executes processes, which will be described hereinafter, in cooperation with the application 800 or the NIC OS 900 serving as software.

The print job input process in the embodiment 2 will be described with reference to FIG. 28.

In FIG. 28, the NIC 700 receives the print data from the client PC 300 (print data receiving unit). The NIC 700 also stores the received print data into the mass storage 500.

Since processes in steps S001 to S019 are substantially the same as those in the embodiment 1, their description is omitted here.

However, prior to the process of step S009, whether or not the job is analyzed after the card was put over the card reader is discriminated with reference to the setting information 802. If it is decided as a discrimination result that the job is analyzed after the card was put over the card reader, the processing routine advances to step S010 in FIG. 8 through step S009. If it is decided as a discrimination result that the job is not analyzed after the card was put over the card reader (that is, the job is analyzed immediately after the print job was input), the processing routine advances to step S020 in FIG. 28 through step S009.

As illustrated in FIG. 28, in the job input process in the embodiment 2, the application 800 executes a job header analyzing process illustrated in FIG. 29 (step S020). That is, the color analysis of the print data is started according to the reception of the print data and, after completion of the color analysis, the print job is written into the file system 501. As will be described hereinafter, there is also a case where when the processing routine advances to step S802, the print job is written without performing the color analysis.

After completion of the job header analyzing process, the application 800 forms the job information 820 (step S011). In this instance, the job information 820 is formed based on the information (the user name 821, job name 823, header color index 825, and color information 826) decided in the job header analyzing process illustrated in FIG. 29. The file name 822 is set by the same method as that in the embodiment 1. The time stamp 824 is set in step S018.

Subsequently, a print job header analyzing process in the embodiment 2 will be described with reference to FIG. 29.

In FIG. 29, the application 800 analyzes the print information management header 311 of the received print data and obtains necessary information as job information 820.

As illustrated in FIG. 29, the application 800 analyzes the print information management header 311 included in the job 310 and sets the job owner 312 included in the print information management header 311 to the user name 821 in the job information 820 (step S601). The application 800 also sets the job name 313 included in the print information management header 311 to the job name 823 in the job information 820 (step S602). The file name 822 and the time stamp 824 in the job information 820 are set by units similar to those described in the embodiment 1 (steps S011 and S018).

The application 800 also analyzes the color mode 314 included in the print information management header 311 and executes a branching process according to an analysis result (step S603).

If the color mode 314 is not included in the print information management header 311, the application 800 sets "monochrome" into the color information 826 in the job information 820 (step S604). This is because if the print data was formed by using the printer driver corresponding to the monochromatic type, since the formed print data is naturally the monochromatic data, there is a case where the color mode 314 is not set into the print information management header 311. The application in the embodiment is constructed so as to operate when the type of the printing apparatus 1000 is any one of the monochromatic type and the color type.

If the color mode 314 is included in the print information management header 311, the application 800 sets an index into the header color index 825 in the job information 820 (FIG. 34) (step S605). The above index shows in which designated number of byte of the print information management header 311 the color mode 314 has been set. It is data necessary when executing the forced monochromatic printing. If the index has previously been obtained, since a troublesomeness for analyzing can be omitted later, the above process is executed in order to improve the performance of the forced monochromatic printing.

The application 800 discriminates the contents of the color mode 314 included in the print information management header 311 (step S606). If the color mode 314 indicates the monochromatic mode, the processing routine advances to step S604. If the color mode 314 indicates the color mode, the processing routine advances to step S607. If the color mode 314 indicates the automatic mode, the processing routine advances to step S608.

If the color mode 314 included in the print information management header 311 indicates "monochrome", the application 800 sets "monochrome" into the color information 826 in the job information 820 (FIG. 34) (step S604).

If the color mode 314 included in the print information management header 311 indicates "color", the application 800 sets "color" into the color information 826 in the job information 820 (step S607).

If the color mode 314 included in the print information management header 311 indicates "automatic", the application 800 sets "during analysis" into the color information 826 in the job information 820 (step S608). "automatic" mentioned here denotes that the color mode is discriminated from the contents (PDL) of the job instead of the information of the print information management header 311. The job header analyzing process is finished here and the processing routine advances to step S011 in FIG. 28. A print job PDL analyzing process illustrated in FIG. 30 is executed (step S609) asynchronously with the process (step S011). The reason why the process is asynchronously executed is to improve the performance of the print job input process of the user. Assuming that the processing routine advances to step S011 after completion of the print job PDL analyzing process, the user cannot finish the print job input unless the analyzing process is finished. That is, since the next print job cannot be input, the asynchronous process is executed. There is a case where it takes a long time for a print job analysis, which will be described hereinafter. For the user, such a situation that the input is not completed for a long time occurs. To prevent such a situation, the print job PDL analysis which needs a long time is asynchronously executed.

If the color mode 314 indicates the monochrome/color in steps S604 and S607, the color information 826 is set to color/monochrome without performing the PDL analysis. The above construction conforms with such specifications of the printer driver that the contents of the header of the print job are preferentially used than the PDL of the print job. However, ordinarily, since the printer driver fundamentally has such a mechanism that "automatic" is set into the color mode 314 and whether the color mode 314 indicates "color" or "monochrome" is discriminated by the PDL, such a process is hardly executed. In many cases, the color mode 314 is determined to be "automatic" in the discriminating step S606 and the processing routine advances to step S608.

Subsequently, the job PDL analyzing process in the embodiment 2 will be described with reference to FIG. 30.

In FIG. 30, the application 800 analyzes the PDL data 315 in the job 310 and discriminates whether the job is a color job or a monochromatic job.

As illustrated in FIG. 30, the application 800 discriminates whether or not the analysis of the PDL data 315 in the job 310 has been finished (step S701). A reference of the discrimination about the end of the analysis is based on whether or not the analysis of all pages of the PDL data 315 has been finished.

As a result of the discrimination, if the analysis of all of the pages has been finished, the application 800 sets "monochrome" into the color information 826 in the job information 820 (step S702). This is because during the page analysis of the PDL data 315, if the page is a color page (color data), the analysis is finished (step S704), and therefore, the determination that the analysis of all of the pages has been finished is synonymous with that all pages are monochromatic.

If there is a page which is not yet analyzed as a result of the discrimination, the application 800 analyzes the page of the PDL data 315 while decrypting the job 310 (print data analyzing unit) (step S703). The PDL data 315 certainly starts with the color mode declaration. Such a mechanism that with respect to the page which has been changed from the color mode (color or monochrome) declared by the color mode declaration, the attribute of the color mode change and the changed value (color or monochrome) are set to the head of the page.

Subsequently, the application 800 discriminates whether or not the attribute of the color mode declaration or the color mode change exists in the head of the page and, if those attributes exist, the application 800 discriminates whether or not the value indicates the color (color data) or monochrome (monochromatic data) (step S704).

As a result of the discrimination, if the page is decided to be a monochromatic page, the application 800 analyzes the next page again (step S701). Specifically speaking, such a case corresponds to a case where the color mode declaration (monochrome) or the color mode change (monochrome) has been set in the current page, or a case where the attribute of the color mode declaration or the color mode change is not set in the current page and the latest color mode declaration or color mode change has been set to monochrome.

As a result of the discrimination, if the page is decided to be a color (color data) page, the application 800 interrupts the analyzing process and sets "color" into the color information 826 in the job information 820 (step S705). Specifically speaking, such a case corresponds to a case where the color mode declaration (color) or the color mode change (color) has been set in the current page. When the page is decided to be a color page, since the analyzing process is interrupted at a point of time when the page has reached the color page, the PDL data analysis which takes a long time can be performed as soon as possible. If at least one page is color, since the job can be regarded as a color job, the analyzing process is finished at such a point of time without analyzing up to the last page.

Subsequently, the color restricting process in the embodiment 2 will be described with reference to FIGS. 31 and 32.

In FIG. 31, the user information 210, setting information 802, and job information 820 are integratedly discriminated and any one of a normal printing, a forced monochromatic printing, an analysis standby, and a print inhibition is executed for the user's job.

The normal printing denotes that the print job is output as it is without performing the color restriction. The forced monochromatic printing denotes that the print job is forcedly rewritten into a monochromatic job and output. The analysis standby denotes that the printed matter is not output but the apparatus waits until the job analysis is finished. The print inhibition denotes that the print job is not output but is deleted.

As illustrated in FIG. 31, the application 800 discriminates whether or not the user has the authority of printing the color job by referring to the use restriction 218 in the user information 210 corresponding to the card ID 211 which was read out in step S100 and has been recorded in the IC card 410 (step S801). It is assumed that the discrimination is made in a manner similar to that mentioned in step S123.

As a result of the discrimination, if it is decided that the user has the authority of the color printing (he can perform the color printing), the application 800 interrupts the analyzing process (step S802). The analyzing process mentioned here denotes a series of processes of steps S701 to S705. An interruption is made to those processes, thereby interrupting the process. If the analysis of the job has already been finished at this time, the analyzing process is not interrupted. The reason why the analysis is interrupted when the user has the authority of the color printing is that if the color job can be printed, since it doesn't matter if the color mode of the job is any mode, the color information 826 becomes unnecessary. Thus, the color printing can be performed without deteriorating the processing speed of the user who can perform the color printing.

As a result of the discrimination, if it is decided that the user does not have the authority of the color printing, the application 800 discriminates the color restricting mode 219 in the user information 210 (step S803).

As a result of the discrimination, if the color restricting mode 219 in the user information 210 has been set to "not set", the application 800 discriminates the color restricting mode 839 in the setting information 802 (step S804). The color restricting mode 219 which is set in the user information 210 and the color restricting mode 839 which is set in the setting information 802 are setting items having the same meaning. By allowing the settings of the same meaning to be included in the user information 210 and the setting information 802, the process can be changed every user, or the processing method can be uniformly set by the application 800, and the more flexible color restriction can be performed.

If the color restricting mode 219 in the user information 210 or the color restricting mode 839 in the setting information 802 has been set to "not apply", the application 800 performs the analysis interruption mentioned above (step S802). As a case where the color restricting mode has been set to "not apply", an office where it is decided that it is unnecessary to perform the color restriction for the staff members or an office where it is demanded that all staff members perform the color printing is considered. As mentioned above, even in a system which performs the color restriction, by purposely providing a setting in which the color restriction is not performed, the system can cope with various kinds of environments.

If a value other than "not apply" and "not set" has been set into the color restricting mode 219 in the user information 210 or the color restricting mode 839 in the setting information 802, the application 800 discriminates whether or not the color information 826 in the job information 820 indicates "during analysis" (step S805). More specifically speaking, such a case corresponds to a case where they have been set to "force" or "analyze".

If the color information 826 in the job information 820 has been set to "during analysis", the application 800 discriminates the color restricting mode 219 in the user information 210 (step S806). Only when the color restricting mode 219 has been set to "not set", the application 800 discriminates the color restricting mode 839 in the setting information 802 (step S807). The reason why the similar settings of the user information 210 and the setting information 802 are discriminated is as mentioned before.

As results of the discrimination, if the setting value is "analyze", the application 800 displays the message which is being analyzed without outputting the printed matter (step S834). If the setting value is "force", the application 800 interrupts the analyzing process (step S808) and executed the forced printing (step S832). The analysis interrupting process here (step S808) is executed in a manner similar to the foregoing analysis interrupting process (step S802).

The above series of processes (steps S805 to S807) is the processes which are executed in the case where the user puts the card over the card reader and performs the print instruction before the PDL data analyzing process which is asynchronously executed by the application 800 after the reception of the print data is finished. At this time, not only by merely waiting for the end of the analysis (step S834) but also by forcedly executing the monochromatic printing (step S832) depending on the user information 210 or the setting information 802 of the application 800, the following operations can be realized. That is, in case of urgent, even if the picture quality deteriorates slightly, the forced monochromatic printing is executed, and in the case of attaching importance to the picture quality, the printing is executed after waiting for completion of the analysis. In other words, the flexible color restriction can be executed according to needs of the user. Moreover, unlike the embodiment 1, the timing for analyzing is not the timing after the card was detected but is the timing when the job has been received. Therefore, the analyzing process can be progressed for a time interval until the user inputs the job from his seat and subsequently walks to the place of the SFP so as to execute the printing.

As a result of the discrimination of step S805, if the color information 826 in the job information 820 has been set to a mode other than "during analysis", the application 800 discriminates whether the value is "color" or "monochrome" (step S809).

As a result of the discrimination, if the color information 826 has been set to "monochrome", the application 800 executes the normal printing (step S830). This is because if the job can be decided to be monochromatic, even if there is no color printing authority of the user and the printing is performed, no problem will occur. Therefore, such a problem that since the forced monochromatic printing is executed even in the case of the monochrome, the picture quality deteriorates can be avoided.

As a result of the discrimination, if the color information 826 has been set to "color", the application 800 discriminates the post-analysis print mode 220 in the user information 210 (step S810). Only when it has been set to "not set", the application 800 discriminates the post-analysis print mode 840 in the setting information 802 (step S811). The reason why the similar settings of the user information 210 and the setting information 802 are discriminated is as mentioned before.

As results of the discrimination, if the setting value is "inhibit", the application 800 inhibits the printing (steps S833, S831). If the setting value is "force", the application 800 executes the forced printing (step S832).

The above series of processes (steps S809 to S811) is the processes which are executed in the case where although the user does not have the color printing authority, the job to be printed is "monochrome". At this time, not only by merely inhibiting the printing (steps S833, S831) but also by forcedly executing the monochromatic printing (step S832) depending on the user information 210 or the setting information 802 of the application 800, either a mode in which when the user does not have the authority, the printing is perfectly inhibited or a mode in which when the user does not have the authority, a strong restriction like an inhibition is not performed but the print data is output as monochromatic data can be selected. In other words, the flexible color restriction can be executed according to the needs of the user.

In FIG. 32, the detailed processes such as normal printing, forced monochromatic printing, analysis standby, and print inhibition are executed.

As illustrated in FIG. 32, in the case of executing the normal printing (step S830), the application 800 obtains the job 310 from the mass storage 500 based on the file name 822 in the job information 820 and transmits the data to the printing apparatus 1000 through the NIC OS 900 while decrypting the obtained job 310 (step S830). This process is similar to that shown in step S302.

After completion of the printing, the application 800 deletes the job (step S831). This process is similar to that shown in step S313.

In the case of executing the forced monochromatic printing (step S832), the application 800 obtains the job 310 from the mass storage 500 based on the file name 822 in the job information 820 and transmits the data to the printing apparatus 1000 through the NIC OS 900 while decrypting the obtained job 310 (step S832). At this time, the header color index 825 in the job information 820 is transferred to the NIC OS 900 and the forced monochromatic printing is realized. The details of this process are similar to those of the process in step S307. In the embodiment 1 of the secure print system 1, after the card was detected, the header color index is analyzed (steps S304 to S306). However, in the embodiment 2, since the header color index has already been analyzed when the job is received, there is no need to perform the analysis at this point of time and the performance at the time of the forced monochromatic printing can be improved.

In the case of inhibiting the printing (steps S833, S831), the application 800 selects "user error" of the message 4 from the messages illustrated in FIG. 33 and executes the user notifying process illustrated in FIG. 15. By this process, the user is notified that the printing cannot be performed because the user does not have the authority.

After completion of the above process, the application 800 deletes the job (step S831). In many cases, generally, the print authority of the user is not often changed. The reason why the job is deleted at this time is to prevent such a situation that an error occurs every printing because there is no authority of the user.

In the case of performing the analysis standby, the application 800 selects "during analysis" of a message 6 from the messages illustrated in FIG. 33 and executes the user notifying process illustrated in FIG. 15 (step S834). By this process, the user is notified that the job is being analyzed.

As mentioned above, according to the embodiments of the invention, the mechanism which can avoid the deterioration in picture quality that is caused by restricting the color printing according to the authority and forcedly executing the monochromatic printing can be provided.

The mechanism which restricts the color printing according to the authority without deteriorating the performance can be provided.

Although the present invention has been described above with respect to the exemplary embodiments such as a network interface apparatus and the like according to the invention with reference to the accompanying drawings, the invention is not limited to the disclosed exemplary embodiments. Naturally, many various changes and modifications could have easily been made by persons who have common knowledge in the technical field within the purview of the technical ideas disclosed in the present invention and it is to be understood that they naturally belong to the technical scope of the invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-252265, filed Sep. 30, 2008, and No. 2008-320560, filed Dec. 17, 2008, which are hereby incorporated by reference herein in their entirety.

What is claimed is:

1. A network interface apparatus which is connected to an image forming apparatus and can communicate with an information processing apparatus for transmitting print data including management information and an external apparatus for storing print authority information, comprising:

a print data receiving unit configured to receive the print data from the information processing apparatus;

a first storage unit configured to store the print data received by the print data receiving unit into a memory;

a user identification information receiving unit configured to receive user identification information for identifying a user;

a print authority information obtaining unit configured to obtain the print authority information corresponding to the user identification information received by the user identification information receiving unit from the external apparatus;

a color print discriminating unit configured to discriminate whether or not the user can perform a color printing according to the print authority information;

a print data analyzing unit configured to perform a color analysis of the print data stored in the memory; and a print data transmitting unit configured to transmit the print data stored in the memory to the image forming apparatus in order to allow the image forming apparatus to print the print data, wherein if it is determined by the color print discriminating unit that the color printing cannot be performed and if it is determined as a result of the analysis by the print data analyzing unit that first print data does not include the color data, the print data transmitting unit transmits the first print data to the image forming apparatus without changing color/monochrome setting information included as management information in the first print data to monochrome, and wherein if it is determined by the color print discriminating unit that the color printing cannot be performed and if it is determined as a result of the analysis by the print data analyzing unit that second print data includes the color data, the print data transmitting unit changes the color/monochrome setting information included as the management information in the second print data to the monochrome and transmits the second print data to the image forming apparatus.

2. A network interface apparatus according to claim 1, wherein the print data analyzing unit starts the color analysis of the print data according to the reception of the user identification information in the user identification information receiving unit.

3. A network interface apparatus according to claim 1, wherein the print data analyzing unit starts the color analysis of the print data according to the reception of the print data in the print data receiving unit, and wherein the network interface apparatus further comprises a second storage unit configured to store the print data into the memory after the color analysis of the print data was started.

4. A network interface apparatus according to claim 3, further comprising an interrupting unit configured to interrupt the color analysis in the case where the user identification information of the user who can perform the color printing is received by the user identification information receiving unit during the color analysis of the print data in the print data analyzing unit,
wherein when the color analysis is interrupted by the interrupting unit, the second storage unit stores the print data into the memory without performing the color analysis of the print data.

5. A network interface apparatus according to claim 1, further comprising a color analysis discriminating unit configured to discriminate whether the color analysis of the print data is performed according to the reception of the print data in the print data receiving unit or the color analysis of the print data is performed according to the reception of the user identification information in the user identification information receiving unit,
wherein if it is determined by the color analysis discriminating unit that the color analysis of the print data is performed according to the reception of the print data, the print data analyzing unit performs the color analysis before the print data is stored into the memory, and
wherein if it is determined by the color analysis discriminating unit that the color analysis of the print data is performed according to the reception of the user identification information, the print data analyzing unit obtains the print data stored in the memory and performs the color analysis.

6. A network interface apparatus according to claim 1, further comprising a switching unit configured to switch a setting in which the color/monochrome setting information included as the management information in the second print data is changed to the monochrome and the second print data is transmitted to the image forming apparatus or a setting in which the printing of the second print data is inhibited according to an instruction from an outside.

7. A network interface apparatus according to claim 1, wherein the print data transmitting unit forcedly changes the color/monochrome setting information included as the management information in the second print data to the monochrome without performing the analysis by the print data analyzing unit and transmits the second print data, and
wherein the network interface apparatus further comprises a discriminating unit configured to, if it is determined by the color print discriminating unit that the color printing cannot be performed, discriminate whether the color analysis of the print data is performed or the second print data is forcedly changed to monochrome.

8. A network interface apparatus according to claim 7, wherein the discriminating unit discriminates based on setting information showing whether the color analysis which has been preset every user is performed or the print data is forcedly changed to monochrome.

9. A network interface apparatus according to claim 1, further comprising an index obtaining unit configured to obtain an index of the color/monochrome setting information included as the management information in the print data,
wherein the print data memory encrypts the print data every block and stores the encrypted print data, and
wherein when the encrypted print data is decrypted every block, the print data transmitting unit changes the color/monochrome setting information of the block to monochrome based on the index obtained by the index obtaining unit.

10. A method of processing print data, comprising:
receiving the print data from an information processing apparatus through a network;
storing the received print data into a memory;
receiving user identification information for identifying a user;
obtaining print authority information corresponding to the received user identification information from an external apparatus;
discriminating whether or not the user can perform a color printing according to the print authority information;
performing a color analysis of the print data stored in the memory; and
transmitting the print data stored in the memory to an image forming apparatus in order to allow the image forming apparatus to print the print data,
wherein if it is determined in the discriminating step that the color printing cannot be performed and if it is determined as a result of the color analysis of the print data that first print data does not include color data, in the transmitting step, the first print data is transmitted to the image forming apparatus without changing color/monochrome setting information included as management information in the first print data to monochrome, and
wherein if it is determined by the discriminating step that the color printing cannot be performed and if it is determined as a result of the color analysis of the print data that second print data includes the color data, the transmitting step changes the color/monochrome setting information included as the management information in the second print data to the monochrome and transmits the second print data to the image forming apparatus.

11. A non-transitory computer readable storage medium that stores a computer program for causing a computer to execute a method for processing print data, the method comprising:
receiving the print data from an information processing apparatus through a network;
storing the received print data into a memory;
receiving user identification information for identifying a user;
obtaining print authority information corresponding to the received user identification information from an external apparatus;
discriminating whether or not the user can perform a color printing according to the print authority information;
performing a color analysis of the print data stored in the memory; and
transmitting the print data stored in the memory to an image forming apparatus in order to allow the image forming apparatus to print the print data,
wherein if it is determined in the discriminating step that the color printing cannot be performed and if it is determined as a result of the color analysis of the print data that first print data does not include color data, in the transmitting step, the first print data is transmitted to the image forming apparatus without changing color/monochrome setting information included as management information in the first print data to monochrome, and wherein if it is determined by the discriminating step that the color printing cannot be performed and if it is determined as a result of the color analysis of the print data that second print data includes the color data, the transmitting step changes the color/monochrome setting information included as the management information in the second print data to the monochrome and transmits the second print data to the image forming apparatus.

12. An image forming apparatus which can communicate with an external apparatus in which print authority information has been stored and executes a printing process of print data, comprising:

a print data receiving unit configured to receive the print data from an information processing apparatus through a network;

a print data memory configured to store the print data received by the print data receiving unit;

a user identification information receiving unit configured to receive user identification information for identifying a user;

a print authority information obtaining unit configured to obtain the print authority information corresponding to the user identification information received by the user identification information receiving unit from the external apparatus;

a color print discriminating unit configured to discriminate whether or not the user can perform a color printing according to the print authority information; and a print data analyzing unit configured to perform a color analysis of the print data, wherein if it is determined by the color print discriminating unit that the color printing cannot be performed and if it is determined as a result of the analysis by the print data analyzing unit that the print data does not include color data, a printing process of the print data is executed without changing color/monochrome setting information included as management information in the print data to monochrome.

* * * * *